United States Patent
Griot et al.

(10) Patent No.: US 11,382,151 B2
(45) Date of Patent: Jul. 5, 2022

(54) TRUNCATED IDENTIFICATION INDICATORS

(71) Applicant: QUALCOMM Incorporated, San Diego, CA (US)

(72) Inventors: Miguel Griot, La Jolla, CA (US); Sebastian Speicher, Wallisellen (CH); Haris Zisimopoulos, London (GB); Lenaig Genevieve Chaponniere, La Jolla, CA (US); Mungal Singh Dhanda, Slough (GB); Prasad Reddy Kadiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 16/859,450

(22) Filed: Apr. 27, 2020

(65) Prior Publication Data

US 2020/0404719 A1 Dec. 24, 2020

(30) Foreign Application Priority Data

Jun. 18, 2019 (GR) .............................. 20190100265

(51) Int. Cl.
*H04W 4/00* (2018.01)
*H04W 76/11* (2018.01)
(Continued)

(52) U.S. Cl.
CPC ............. *H04W 76/11* (2018.02); *H04L 1/003* (2013.01); *H04W 4/80* (2018.02); *H04W 8/08* (2013.01);
(Continued)

(58) Field of Classification Search
CPC ....... H04W 76/11; H04W 76/27; H04W 8/20; H04W 76/19; H04W 8/08; H04W 4/80; H04L 1/003
(Continued)

(56) References Cited

U.S. PATENT DOCUMENTS

2016/0088126 A1* 3/2016 Doan .................... H04L 27/261
370/329
2018/0302918 A1* 10/2018 Shaheen ........... H04W 28/0278
(Continued)

OTHER PUBLICATIONS

International Search Report and Written Opinion—PCT/US2020/030272—ISA/EPO—dated Jul. 7, 2020.
(Continued)

*Primary Examiner* — Marceau Milord
(74) *Attorney, Agent, or Firm* — Qualcomm Incorporated

(57) ABSTRACT

Methods, systems, and devices for wireless communications are described that provide for truncated identification indicators. A user equipment (UE) may receive control signaling indicating a truncating configuration for an identification indicator. The truncating configuration may indicate a set of bits within an initial identification indicator to remove to generate a truncated identification indicator. The UE may remove the indicated set of bits and transmit the truncated identification indicator to a base station. The base station may receive the truncated identification indicator and reconstruct the initial identification indicator according to the truncating configuration. The base station may reconstruct the initial identification indicator by adding the set of bits (e.g., removed by the UE to generate the truncated identification indicator) to the truncated identification indicator.

37 Claims, 16 Drawing Sheets

(51) Int. Cl.
  *H04W 76/19* (2018.01)
  *H04W 4/80* (2018.01)
  *H04W 76/27* (2018.01)
  *H04L 1/00* (2006.01)
  *H04W 8/08* (2009.01)
  *H04W 8/20* (2009.01)

(52) U.S. Cl.
  CPC ............ *H04W 8/20* (2013.01); *H04W 76/19* (2018.02); *H04W 76/27* (2018.02)

(58) Field of Classification Search
  USPC ........................................ 370/329, 331, 342
  See application file for complete search history.

(56) References Cited

U.S. PATENT DOCUMENTS

| | | | | |
|---|---|---|---|---|
| 2018/0324751 | A1* | 11/2018 | Hampel | H04W 68/02 |
| 2019/0357215 | A1* | 11/2019 | Zhou | H04L 5/0098 |
| 2019/0357260 | A1* | 11/2019 | Cirik | H04W 24/08 |
| 2019/0357291 | A1* | 11/2019 | Zhou | H04W 24/08 |
| 2020/0260300 | A1* | 8/2020 | Cirik | H04L 5/0048 |
| 2020/0267663 | A1* | 8/2020 | Xu | H04W 52/42 |
| 2020/0267702 | A1* | 8/2020 | Kim | H04W 52/386 |
| 2020/0288494 | A1* | 9/2020 | Heo | H04W 72/1284 |
| 2020/0313747 | A1* | 10/2020 | Xu | H04W 72/046 |
| 2020/0313833 | A1* | 10/2020 | Yi | H04W 52/0212 |
| 2020/0314664 | A1* | 10/2020 | Zhou | H04B 7/088 |
| 2020/0314816 | A1* | 10/2020 | Yi | H04W 72/042 |
| 2020/0314917 | A1* | 10/2020 | Jeon | H04W 74/0833 |
| 2020/0321360 | A1* | 10/2020 | Kurata | H01L 27/13 |
| 2020/0351955 | A1* | 11/2020 | Jeon | H04W 76/27 |
| 2020/0374921 | A1* | 11/2020 | Li | H04W 68/005 |
| 2020/0396760 | A1* | 12/2020 | Yi | H04W 72/042 |
| 2021/0051759 | A1* | 2/2021 | Zhou | H04W 72/1289 |
| 2021/0058947 | A1* | 2/2021 | Lin | H04W 72/1268 |
| 2021/0185609 | A1* | 6/2021 | Zhou | H04L 69/28 |
| 2021/0203468 | A1* | 7/2021 | Yi | H04W 76/27 |
| 2021/0243763 | A1* | 8/2021 | Zhou | H04L 1/1819 |
| 2021/0274538 | A1* | 9/2021 | Liu | H04W 72/1289 |
| 2021/0285614 | A1* | 9/2021 | Hellin Navarro | B60Q 1/323 |

OTHER PUBLICATIONS

Nokia, et al., "Stage 3 Aspects for Encoding of Paging Message with Truncated UE-ID," 3GPP Draft, 3GPP TSG-RAN WG2 Meeting #102, R2-1806988, Stage 3 Aspects for Encoding of Paging Message with Truncated UE-ID, 3rd Generation Partnership Project (3GPP), Mobile Competence Centre, 650, Route Des Lucioles, F-06921, Sophia-Antipolis Cedex, France, vol. RAN WG2, No. Busan, South Korea; May 21, 2018-May 25, 2018, May 20, 2018 (May 20, 2018), XP051443416, 6 pages, Retrieved from the Internet: URL:http://www.3gpp.org/ftp/Meetings%5F3GPP%5FSYNC/RAN2/Docs/ [retrieved on May 20, 2018] paragraph [0002].

Qualcomm Incorporated: "Discussion on System Aspects of Connection Reestablishment for Control Plane for NB-IoT," 3GPP Draft, SA WG2 Meeting #134, S2-1906927 DP Reestablishment R2 LS R2-1908264 V2, 3rd Generation Partnership Project (3GPP), Mobile Competence Centre, 650, Route Des Lucioles, F-06921, Sophia-Antipolis Cedex, France, vol. SA WG2, No. Sapporo, Japan; Jun. 24, 2019-Jun. 28, 2019, Jun. 17, 2019 (Jun. 17, 2019), XP051751909, 3 pages, Retrieved from the Internet: URL:http://www.3gpp.org/ftp/tsg%5Fsa/WG2%5FArch/TSGS2%5F134%5FSapporo/Docs/S2%2D1906927%2Ezip [retrieved on Jun. 17, 2019].

SA2: "[Draft] Reply LS on RRC Connection Re-Establishment for CP for NB-IoT," 3GPP Draft, SA WG2 Meeting #134, S2-1907103_LS_OUT_RAN2_REESTABLISHMENT_NBI_OT, 3rd Generation Partnership Project (3GPP), Mobile Competence Centre, 650, Route Des Lucioles, F-06921, Sophia-Antipolis Cedex, France, vol. SA WG2, No. Sapporo, Japan; Jun. 24, 2019-Jun. 28, 2019, Jun. 17, 2019 (Jun. 17, 2019), XP051752079, 8 pages, Retrieved from the Internet: URL: http://www.3gpp.org/ftp/tsg%5Fsa/WG2%5FArch/TSGS2%5F134%5FSapporo/Docs/S2%2D1907103%2Ezip [retrieved on Jun. 17, 2019] the whole document.

* cited by examiner

TRUNCATED IDENTIFICATION INDICATORS

CROSS REFERENCE

The present Application for Patent claims the benefit of Greek Provisional Patent Application No. 20190100265 by GRIOT et al., entitled "TRUNCATED IDENTIFICATION INDICATORS," filed Jun. 18, 2019, assigned to the assignee hereof, and expressly incorporated by reference herein.

FIELD OF TECHNOLOGY

The following relates generally to wireless communications and more specifically to truncated identification indicators.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communications systems may implement a radio resource control (RRC) re-establishment procedure for a wireless device. In some cases, a UE may initiate the RRC re-establishment procedure by transmitting a connection request by a set of allocated resources. The connection request may include one or more information elements relevant to the RRC re-establishment procedure. In some cases, a number of bits of an information element may exceed the number of bits within the allocated resources.

SUMMARY

The described techniques relate to improved methods, systems, devices, and apparatuses that support truncated identification indicators. For example, a user equipment (UE) may undergo a radio resource control (RRC) re-establishment procedure. To initiate the procedure, the UE may transmit an RRC connection request including an identification indicator to the base station. In some cases, a number of bits available for transmitting the identification indicator (e.g., within the RRC connection request) may be limited (e.g., limited to 40 bits). However, the identification indicator may be configured to include more bits than are allocated for transmitting the identification indicator. That is, the identification indicator may include the one or more fields each with defined number bits such that a concatenation of each of the fields yields an identification indicator including more bits than are allocated. For example, the one or more fields may include 48 bits. The configured (e.g., the defined) identification indicator may be referred to an initial indicator. The UE may truncate bits (e.g., remove bits) from the initial or configured identification indicator to decrease the number of bits within the identification indicator to the number of bits available for transmitting the identification indicator. The base station or a core network node (e.g., a control plane entity such as an access and mobility management function (AMF)) may transmit control signaling to the UE indicating a truncating configuration. The truncating configuration may indicate which bits of the initial identification indicator to retain in order to generate a truncated identification indicator. The UE may receive the truncating configuration and remove bits from the initial identification indicator to generate the truncated identification indicator according to the truncating configuration.

A method for wireless communications at a UE is described. The method may include receiving control signaling indicating a truncating configuration for truncating one or more fields of an initial identification indicator, generating a truncated identification indicator for the UE according to the truncating configuration by removing one or more bits from the initial identification indicator, and transmitting the truncated identification indicator to a base station.

An apparatus for wireless communications at a UE is described. The apparatus may include a processor, memory in communication with the processor, and instructions stored in the memory. The instructions may be executable by the processor to cause the apparatus to receive control signaling indicating a truncating configuration for truncating one or more fields of an initial identification indicator, generate a truncated identification indicator for the UE according to the truncating configuration by removing one or more bits from the initial identification indicator, and transmit the truncated identification indicator to a base station.

Another apparatus for wireless communications at a UE is described. The apparatus may include means for receiving control signaling indicating a truncating configuration for truncating one or more fields of an initial identification indicator, means for generating a truncated identification indicator for the UE according to the truncating configuration by removing one or more bits from the initial identification indicator, and means for transmitting the truncated identification indicator to a base station.

A non-transitory computer-readable medium storing code for wireless communications at a UE is described. The code may include instructions executable by a processor to receive control signaling indicating a truncating configuration for truncating one or more fields of an initial identification indicator, generate a truncated identification indicator for the UE according to the truncating configuration by removing one or more bits from the initial identification indicator, and transmit the truncated identification indicator to a base station.

Some examples of the method, apparatuses, and non-transitory computer-readable medium described herein may further include operations, features, means, or instructions for identifying a number of least significant bits of one or more fields of the initial identification indicator based on the truncating configuration, and generating the truncated identification indicator including the identified number of least significant bits of the one or more fields.

In some cases of the method, apparatuses, and non-transitory computer-readable medium described herein, generating the truncated identification indicator further may include operations, features, means, or instructions for removing the one or more bits from the initial identification indicator by removing a number of most significant bits from at least one of the one or more fields of the initial identification indicator according to the truncating configuration. Removing the number of most significant bits may generate one or more truncated fields. Generating the truncated identification indicator further may include operations, features, means, or instructions for concatenating the one or more truncated fields, where the truncated identification indicator includes the concatenated one or more truncated fields.

In some instances of the method, apparatuses, and non-transitory computer-readable medium described herein, the truncated identification indicator includes a concatenation of the one or more fields of the initial identification indicator, where at least one of the one or more fields may be truncated according to the truncating configuration.

In some examples of the method, apparatuses, and non-transitory computer-readable medium described herein, each field of the one or more fields of the initial identification indicator includes a fixed number of bits.

In some cases of the method, apparatuses, and non-transitory computer-readable medium described herein, generating the truncated identification indicator further may include operations, features, means, or instructions for truncating a first field of the one or more fields of the initial identification indicator based on a number of bits within a second field of one or more fields of the truncated identification indicator.

In some instances of the method, apparatuses, and non-transitory computer-readable medium described herein, the one or more fields of the initial identification indicator include a network function identifier field and a UE identifier field.

In some examples of the method, apparatuses, and non-transitory computer-readable medium described herein, the truncated identification indicator includes a temporary mobile subscription identifier.

In some cases of the method, apparatuses, and non-transitory computer-readable medium described herein, the control signaling includes dedicated control signaling or broadcast control signaling.

In some instances of the method, apparatuses, and non-transitory computer-readable medium described herein, the truncated identification indicator may be a radio resource control connection reestablishment message for narrowband-internet of things (NB-IoT).

Some examples of the method, apparatuses, and non-transitory computer-readable medium described herein may further include operations, features, means, or instructions for establishing a connection with the base station based on transmitting the truncated identification indicator.

In some cases of the method, apparatuses, and non-transitory computer-readable medium described herein, receiving the control signaling indicating the truncating configuration may further include operations, features, means, or instructions for receiving the control signaling from an AMF.

A method for wireless communications at a network comprising an AMF function and a base station is described. The method may include determining, by the AMF, a truncating configuration for truncating one or more fields of an initial identification indicator by removing one or more bits from the initial identification indicator, the truncating configuration based on a number of possible values stored in each field of the one or more fields, transmitting, by the AMF, control signaling indicating the truncating configuration, and receiving, by the base station, a truncated identification indicator based on the truncating configuration.

An apparatus for wireless communications is described. The apparatus may include a processor, memory in communication with the processor, and instructions stored in the memory. The instructions may be executable by the processor to cause the apparatus to determine a truncating configuration for truncating one or more fields of an initial identification indicator by removing one or more bits from the initial identification indicator, the truncating configuration based on a number of possible values stored in each field of the one or more fields, transmit control signaling indicating the truncating configuration, and receive a truncated identification indicator based on the truncating configuration.

Another apparatus for wireless communications is described. The apparatus may include means for determining a truncating configuration for truncating one or more fields of an initial identification indicator by removing one or more bits from the initial identification indicator, the truncating configuration based on a number of possible values stored in each field of the one or more fields, means for transmitting control signaling indicating the truncating configuration, and means for receiving a truncated identification indicator based on the truncating configuration.

A non-transitory computer-readable medium storing code for wireless communications is described. The code may include instructions executable by a processor to determine a truncating configuration for truncating one or more fields of an initial identification indicator by removing one or more bits from the initial identification indicator, the truncating configuration based on a number of possible values stored in each field of the one or more fields, transmit control signaling indicating the truncating configuration, and receive a truncated identification indicator based on the truncating configuration.

Some examples of the method, apparatuses, and non-transitory computer-readable medium described herein may further include operations, features, means, or instructions for adding a number of bits to the received truncated identification indicator to generate a restored identification indicator including a same number of bits as the initial identification indicator.

Some examples of the method, apparatuses, and non-transitory computer-readable medium described herein may further include operations, features, means, or instructions for identifying a number of least significant bits of one or more fields of the initial identification indicator, where the truncating configuration may be based on the identified number of least significant bits and the truncated identification indicator includes the identified number of least significant bits of the one or more fields.

In some cases of the method, apparatuses, and non-transitory computer-readable medium described herein, the truncated identification indicator includes a concatenation of the one or more fields of the initial identification indicator, where at least one of the one or more fields may be truncated according to the truncating configuration.

In some instances of the method, apparatuses, and non-transitory computer-readable medium described herein, each field of the one or more fields of the initial identification indicator includes a fixed number of bits.

In some examples of the method, apparatuses, and non-transitory computer-readable medium described herein, determining the truncating configuration further may include operations, features, means, or instructions for determining to truncate a first field of the one or more fields of the initial identification indicator based on a number of bits within a second field of one or more fields of the truncated identification indicator.

In some cases of the method, apparatuses, and non-transitory computer-readable medium described herein, the one or more fields of the initial identification indicator include a network function identifier field and a UE identifier field.

In some instances of the method, apparatuses, and non-transitory computer-readable medium described herein, the truncated identification indicator includes a temporary mobile subscription identifier.

In some examples of the method, apparatuses, and non-transitory computer-readable medium described herein, the control signaling includes dedicated control signaling or broadcast control signaling.

In some cases of the method, apparatuses, and non-transitory computer-readable medium described herein, the truncated identification indicator may be a radio resource control connection reestablishment message for NB-IoT.

Some examples of the method, apparatuses, and non-transitory computer-readable medium described herein may further include operations, features, means, or instructions for establishing a connection with a UE based on receiving the truncated identification indicator.

DETAILED DESCRIPTION

Figure 1:
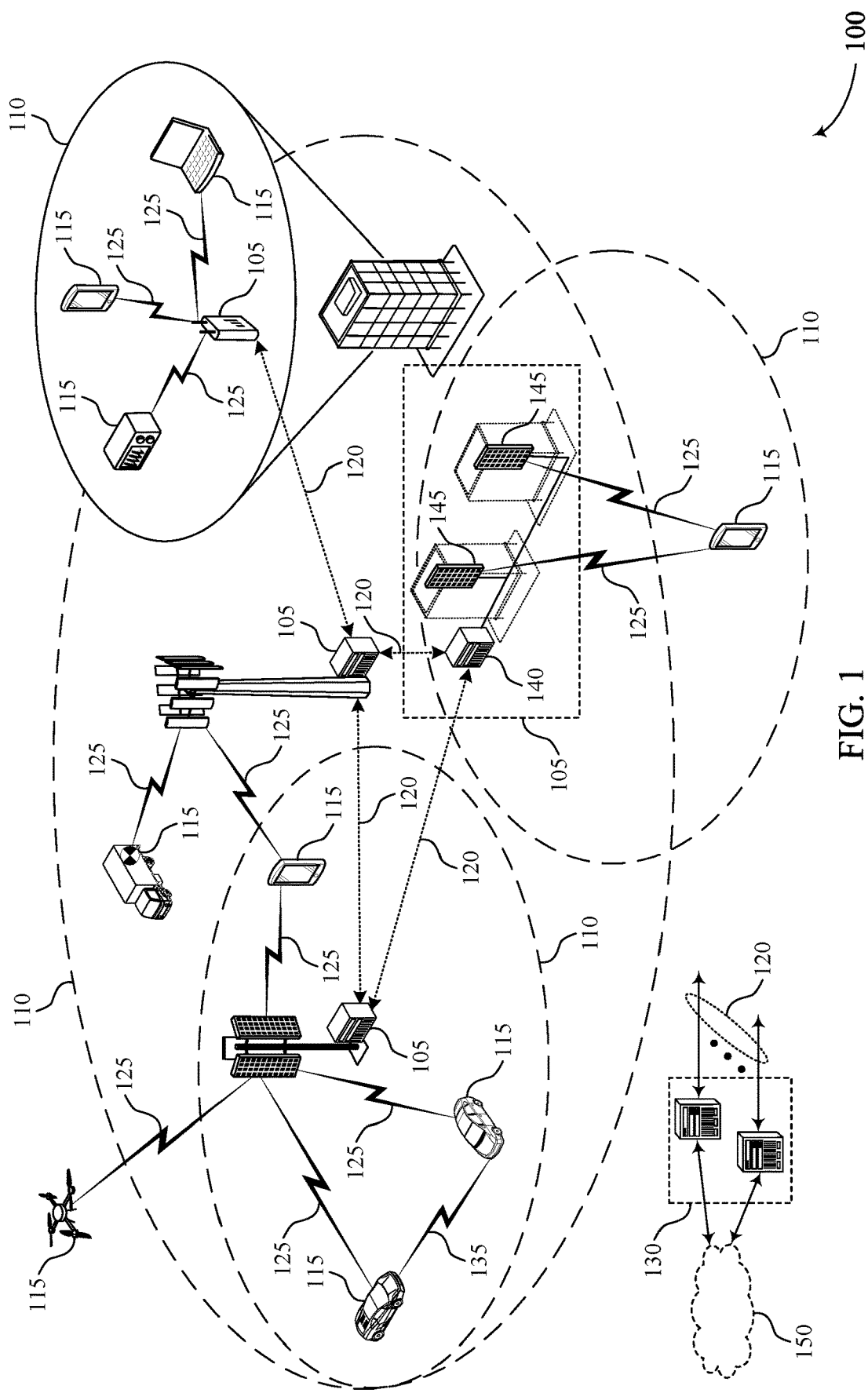
FIG. 1 illustrates an example of a system for wireless communications that supports truncated identification indicators in accordance with aspects of the present disclosure.

Various aspects of the present disclosure provide for truncated identification indicators. For example, a user equipment (UE) may undergo a radio resource control (RRC) re-establishment procedure. In some cases, the RRC re-establishment procedure may be used for a handover procedure with no handover preparation. A UE may undergo the RRC re-establishment procedure for the control plane for narrowband-internet of things (NB-IoT) connected to a 5G core network (e.g., 5GC). To initiate the procedure, the UE may transmit an RRC connection request including an identification indicator to the base station. That is, the identification indicator may be an information element or field within the RRC connection request. The identification indicator may include one or more fields identifying a network function managing the UE context in a network and one or more fields identifying the UE. In some cases, a number of bits available for transmitting the identification indicator (e.g., within the RRC connection request) may be limited. For example, there may be 40 available bits for transmitting the identification indicator within a connection request.

The one or more fields within the identification indicator may initially include more than 40 bits. For example, the identification indicator may be configured to include more bits than are allocated for transmitting the identification indicator. That is the identification indicator may include the one or more fields each with defined number bits where a concatenation of each of the fields may generate an identification indicator including more bits than are allocated. For example, the one or more fields may include 48 bits. The defined identification indicator may be referred to as an initial identification indicator. The UE may truncate bits (e.g., remove bits) of at least one of the fields within the identification indicator to decrease the number of bits within the identification indicator to the number of bits available for transmitting the identification indicator.

The base station or a core network node may transmit control signaling to the UE indicating a truncating configuration. For example, a control plane entity such as an access and mobility management function (AMF) may transmit the control signaling to the UE indicating the truncating configuration. The truncating configuration may indicate a number of bits to retain in each of the fields of an initial identification indicator in order to generate a truncated identification indicator. The truncated identification indicator may include the number of bits available for transmitting the identification indicator while the initial identification indicator may include more bits than are available for transmitting the identification indicator.

The UE may receive the truncating configuration and adjust the initial or defined identification indicator according to the truncating configuration to generate the truncated identification indicator. For example, the truncating configuration may indicate to retain 6 bits of a first field of the identification indicator. The initial (e.g., the defined) number of bits in the first field of the identification indicator may include 10 bits. Here, the UE may remove 4 bits of the first field to truncate the first field to 6 bits. The UE may remove the most significant bits of each field to truncate the field to the indicated number of bits. As a result, the UE may retain the indicated number of least significant bits of each of the fields of the identification indicator. The UE may generate the truncated identification indicator by concatenating each of the fields of the identification indicator (e.g., that have been truncated according to the truncating configuration). The UE may subsequently transmit the truncated identification indicator to the base station which may, in some cases, initiate an RRC re-establishment procedure.

Aspects of the disclosure are initially described in the context of wireless communications systems. Various examples of fields and a process flow are then discussed. Aspects of the disclosure are further illustrated by and described with reference to diagrams and flowcharts that relate to truncated identification indicators.

FIG. 1 illustrates an example of a wireless communications system 100 that supports truncated identification indicators in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology. The base stations 105 may be examples of network equipment (e.g., core network nodes, relay devices, IAB nodes, or other network equipment), as shown in FIG. 1.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread orthogonal frequency division multiplexing (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit of the wireless communications system 100 and may be referred to as a transmission time interval (TTI). In some cases, the TTI duration (that is, the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a carrier may support multiple cells, and different cells may be configured according to different protocol types (e.g., MTC, NB-IoT, enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an AMF) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

A UE 115 may undergo an RRC re-establishment procedure. To initiate the procedure, the UE 115 may transmit an RRC connection request including an identification indicator to a base station 105. In some cases, a number of bits available for transmitting the identification indicator (e.g., within the RRC connection request) may be limited (e.g., limited to 40 bits). However, the identification indicator may be configured to include more bits than are allocated for transmitting the identification indicator. That is, the identification indicator may include the one or more fields each with defined number bits such that a concatenation of each of the fields yields an identification indicator including more bits than are allocated. For example, the one or more fields may include 48 bits. The configured (e.g., the defined) identification indicator may be referred to an initial indicator. The UE 115 may truncate bits (e.g., remove bits) from the initial or configured identification indicator to decrease the number of bits within the identification indicator to the number of bits available for transmitting the identification indicator. The base station 105 or a core network node (e.g., a control plane entity such as an AMF) may transmit control signaling to the UE 115 indicating a truncating configuration. The truncating configuration may indicate which bits of the initial identification indicator to retain in order to generate a truncated identification indicator. The UE 115 may receive the truncating configuration and remove bits from the initial identification indicator to generate the truncated identification indicator according to the truncating configuration.

Figure 2:
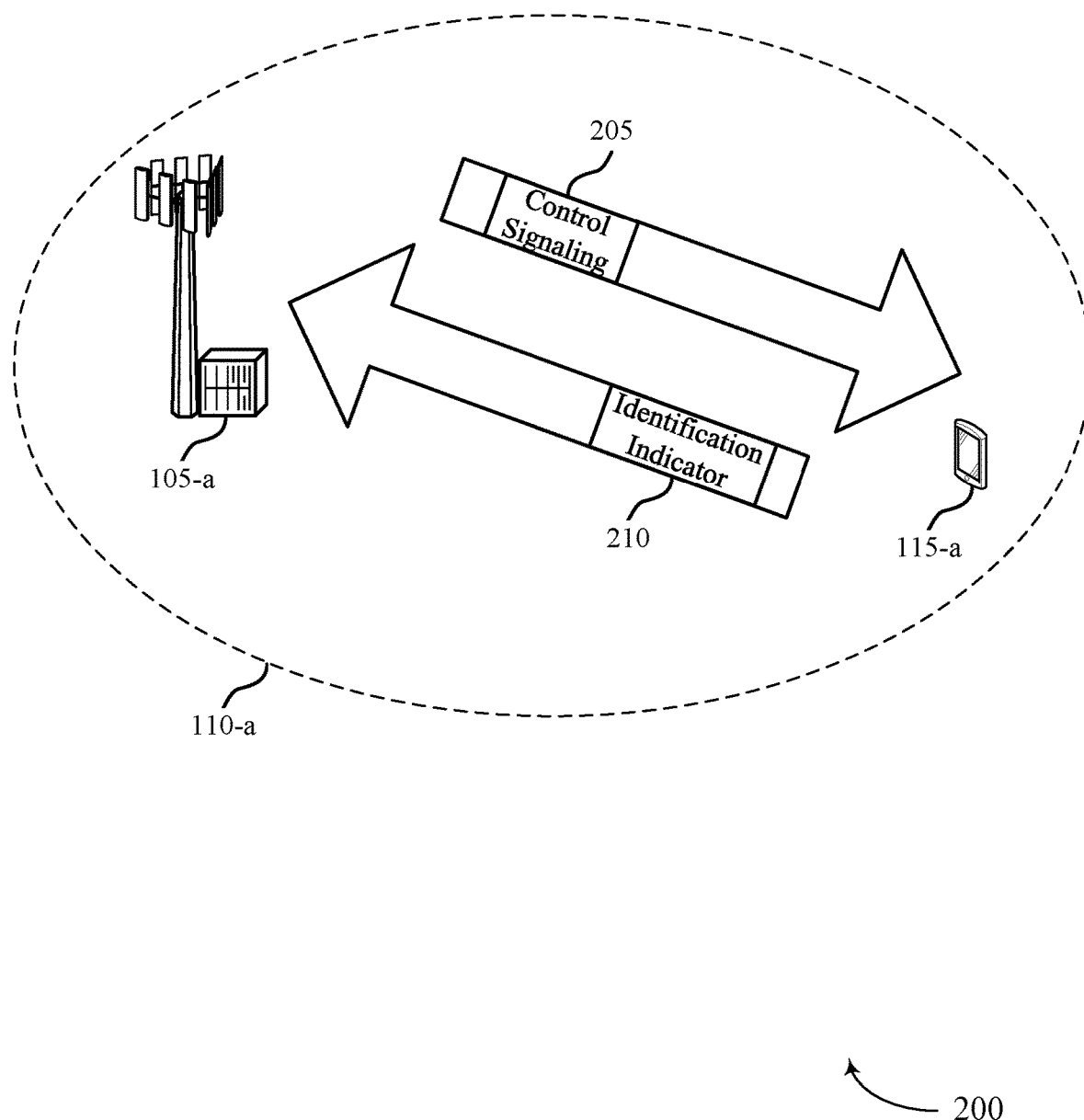
FIG. 2 illustrates an example of a system for wireless communications that supports truncated identification indicators in accordance with aspects of the present disclosure.

FIG. 2 illustrates an example of a wireless communications system 200 that supports truncated identification indicators in accordance with aspects of the present disclosure. In some examples, wireless communications system 200 may implement aspects of wireless communications system 100. The wireless communications system 200 may include base station 105-*a* and UE 115-*a*, which may be examples of the corresponding devices described with reference to FIG. 1. The base station 105-*a* may correspond to a network node such as a core network node as described with reference to FIG. 1. The base station 105-*a* may transmit downlink communications to UE 115-*a* including control signaling 205. Further, the UE 115-*a* may transmit uplink communications to base station 105-*a* including an identification indicator 210.

The base station 105-*a* may transmit control signaling 205 to the UE 115-*a*. For example, a core network node (e.g., a control plane entity such as an AMF) may transmit the control signaling 205 to the UE 115-*a* via the base station 105-*a*. In another example, the control network node such as the AMF may transmit the control signaling 205 to the UE 115-*a* directly. In some cases, the control signaling 205 may be dedicated signaling. For example, the base station 105-*a* or other core network node may transmit dedicated RRC control signaling 205 to the UE 115-*a*. In some other cases, the control signaling 205 may be broadcasted (e.g., in system information signaling such as a system information block (SIB)). That is, the base station 105-*a* or control network node may transmit the control signaling 205 to more than one UE 115. For example, the base station 105-*a* or the control network node may transmit the control signaling 205 to each of the UEs 115 within a coverage area 110-*a* associated with the base station 105-*a*. The control signaling 205 may include a truncating configuration indicating a number of bits to retain in each of the fields of an initial identification indicator in order to generate a truncated identification indicator 210. The initial identification indicator may correspond to a defined or preconfigured identification indicator. For example, the initial identification indicator may include one or more fields each with a defined or preconfigured number bits.

The base station 105-*a* or core network node (e.g., the AMF) may determine that the number of bits within the initial identification indicator exceeds a number of bits available for the transmission of the identification indicator 210. For example, the UE 115-*a* may transmit the identification indicator 210 as part of a connection request message to initialize an RRC connection re-establishment procedure for a control plane for NB-IoT, where the connection request message includes 40 bits allocated to the transmission of the identification indicator 210. The identification indicator 210 may correspond to a 5G-shortened-temporary mobile station identity (5G-S-TMSI). In some cases, the size of the initial identification indicator may exceed 40 bits (e.g., 48 bits). Here, the truncating configuration may indicate to the UE 115-*a* to retain a total of 40 bits of the initial identification indicator (e.g., and remove eight bits). The truncating configuration may include rules indicating which bits of the initial identification indicator may be removed to generate the truncated identification indicator 210.

The base station 105-*a* or the core network node (e.g., the AMF) may determine the truncating configuration based on a number of distinct values each field may indicate. For example, if a first field of the identification indicator 210 (e.g., an AMF set identifier) may indicate twenty distinct values, the base station 105-*a* or core network node may determine that the first field of the identification indicator 210 retains least 5 bits (e.g., corresponding to $2^5$ or 32 distinct values). In another example, if a second field (e.g., an AMF set pointer) of the identification indicator 210 may indicate 80 distinct values, the base station 105-*a* or core network node may determine that the second field of the identification indicator 210 retains at least seven bits (e.g., corresponding to $2^7$ or 128 distinct values). In another example, if a third field (e.g., a temporary mobile station identity (TMSI)) of the identification indicator 210 may indicate 2,000,000,000 distinct values, the base station 105-*a* or core network node may determine that the third field of the identification indicator 210 retains at least 31 bits (e.g., corresponding to $2^{31}$ or 2,147,483,648 distinct values).

The UE 115-*a* may receive the control signaling 205 and transmit the identification indicator 210 to the base station 105-*a* according to the truncating configuration. The identification indicator 210 may be a truncated identification indicator 210 including a subset of bits of the initial identification indicator. For example, the UE 115-*a* may remove one or more bits (e.g., most significant bits) from each of the three fields of the initial identification indicator to reduce the number of bits in each field to the number of bits indicated by the truncating configuration.

That base station 105-*a* may receive the truncated identification indicator 210 from the UE 115-*a*. The base station 105-*a* may reconstruct the initial identification indicator from the truncated identification indicator 210 by adding a number of bits to the truncated identification indicator 210 (e.g., based on the truncating configuration indicated by the control signaling 205). For example, the truncating configuration may indicate for the UE 115-*a* to remove 8 bits from the initial identification indicator to generate the truncated identification indicator 210. Here, the base station 105-*a* may add 8 bits (e.g., 8 logic value '0' bits) to the truncated identification indicator 210 upon receiving the truncated identification indicator 210 from the UE 115-*a*. The base station 105-*a* may add the bits with a configurable set of bit values. For example, each of the added bits may be logic value '0's. Additionally or alternatively, the base station 105-*a* may add bits with different logic values to the truncated identification indicator 210.

Figure 3:
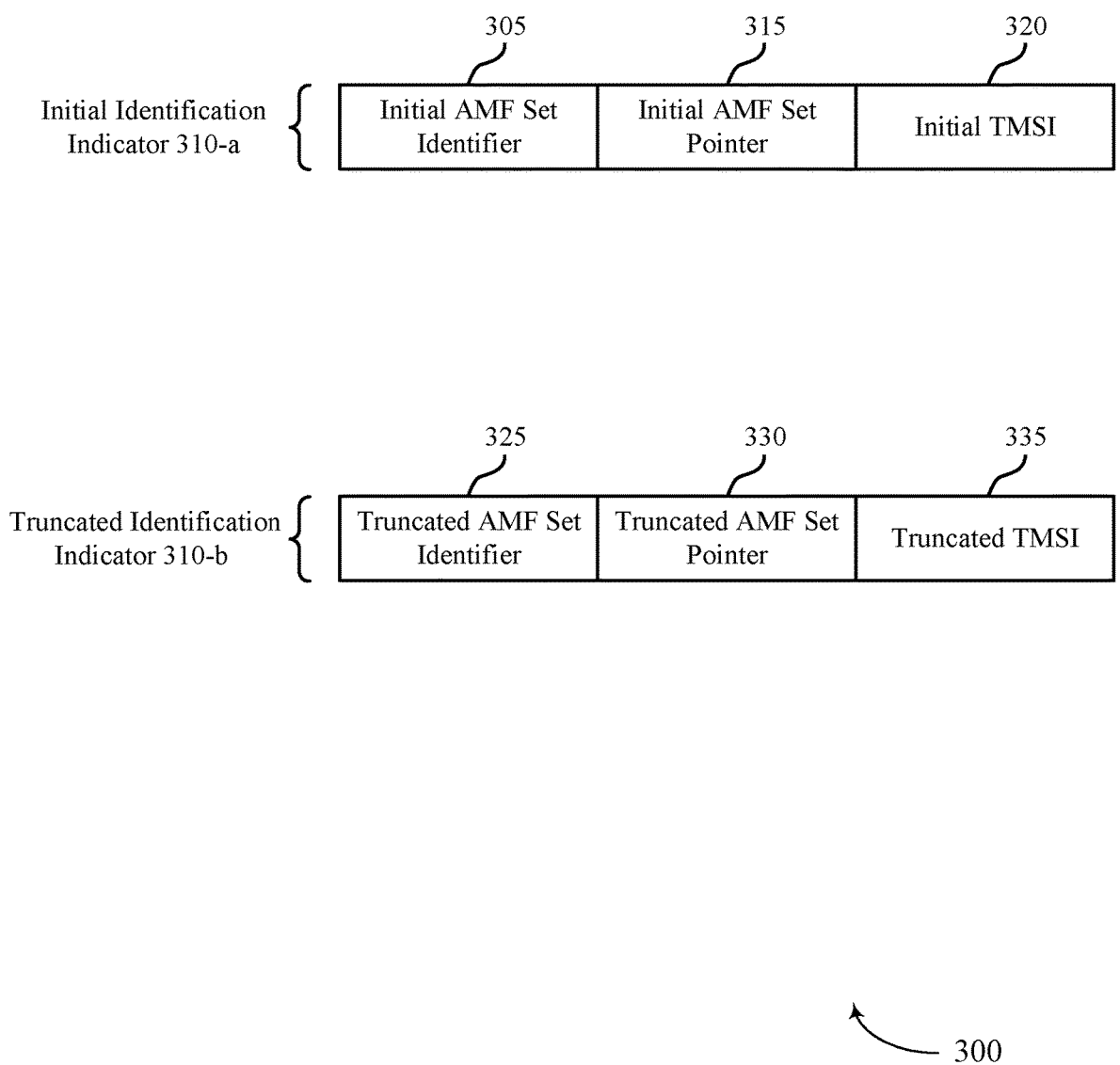
FIGS. 3 and 4 illustrate examples of fields that support truncated identification indicators in accordance with aspects of the present disclosure.

FIG. 3 illustrates examples of fields 300 that support truncated identification indicators in accordance with aspects of the present disclosure. In some examples, fields 300 may be related to wireless communications systems 100 and 200. For example, the fields 300 may include the identification indicator 310, which may be examples of the corresponding identification indicators described with reference to FIG. 2. Further, the identification indicator 310 may be communicated between a UE and base station, which may be examples of the corresponding devices described with reference to FIGS. 1 and 2. For example, the identification indicator 310 may be transmitted (e.g., by the UE to the base station) in a field 300 of an RRC connection re-establishment procedure for the control plane for NB-IoT (e.g., connected to 5GC).

In some cases, RRC connection re-establishment procedure may allocate a fixed number of bits (e.g., 40 bits) for the identification indicator 310. In some cases, an initial identification indicator 310-*a* may include more bits than the allocated number of bits for transmitting the identification indicator 310. The initial identification indicator 310-*a* may correspond to a defined or preconfigured identification indicator 310-a. For example, the initial identification indicator 310-a may include one or more fields each with a defined or preconfigured number bits.

Because the initial identification indicator 310-a includes more bits than the allocated number of bits, the UE may generate a truncated identification indicator 310-b by removing a number bits from the initial identification indicator 310-a. The UE may remove bits from the initial identification indicator 310-a to generate the truncated identification indicator 310-b according to a truncating configuration. The truncating configuration may indicate a number of bits to retain (and, in some cases, remove) from one or more the fields 300 of the initial identification indicator 310-a.

The initial identification indicator 310-a may include three different fields 300: an AMF set identifier 305, an AMF set pointer 315, and a TMSI 320. The AMF set identifier 305 may uniquely identify an AMF set within an AMF region. The AMF pointer 315 may identify one or more AMFs within the AMF set. The TMSI 320 (e.g., a 5G-TMSI) may uniquely identify the UE within the network function managing the UE context in the network. In some cases, only a subset of the bits of the fields 300 may be used for unique identification. For example, only a subset of the least significant bits of the AMF set identifier 305 may be used to uniquely identify an AMF set within the AMF region. Here, the remaining bits (e.g., the remaining most significant bits) may be set to 0. The truncated identification indicator 310-b may include the truncated AMF set identifier 325, the truncated AMF set pointer 330, and the truncated TMSI 335. Each of the fields 300 of the truncated identification indicator 310-b may identify the same components as the corresponding fields in the initial identification indicator 310-a. Additionally, each of the fields 300 of the truncated identification indicator 310-b may include at least the subset of least significant bits of the fields 300 of the initial identification indicator 310-a used to uniquely identify a component.

The truncating configuration may be based on the size of the subset of bits of the fields 300 that are used for unique identification. In some cases, the truncating configuration may indicate for at least the subset of bits that are used for unique identification to be retained. For example, if 3 bits of the initial AMF set pointer 315 are used for identifying one or more AMFs within the AMF set (e.g., identified by the initial AMF set identifier 305), the truncating configuration may indicate to retain at least 3 bits of the initial AMF set pointer 315 in the truncated AMF set identifier 325. In some cases, the number of bits to be retained in a first field (e.g., the initial TMSI 320) may be based on the number of bits to be retained in one or more other fields (e.g., the initial AMF set identifier 305 and the initial AMF set pointer 315). For example, the allocated resources (e.g., number of bits) for transmitting an identification indicator 310 may be 40 bits. If removing bits from the two fields (e.g., the initial AMF set identifier 305 and the initial AMF set pointer 315) decreases the number of bits of the identification indicator 310-a to 40, the truncating configuration may indicate to retain all of the bits of the TMSI 320. Here, the initial TMSI 320 and the truncated TMSI 335 may include a same number of bits. Alternatively, if truncating the initial AMF set identifier 305 and the initial AMF set pointer 315 to generate the truncated AMF set identifier 325 and the truncated AMF set pointer 330 does not decrease the size of the initial identification indicator 310-a to 40 bits, the truncating configuration may indicate to remove one or more bits of the initial TMSI 320 to generate the truncated TMSI 335.

Figure 4:
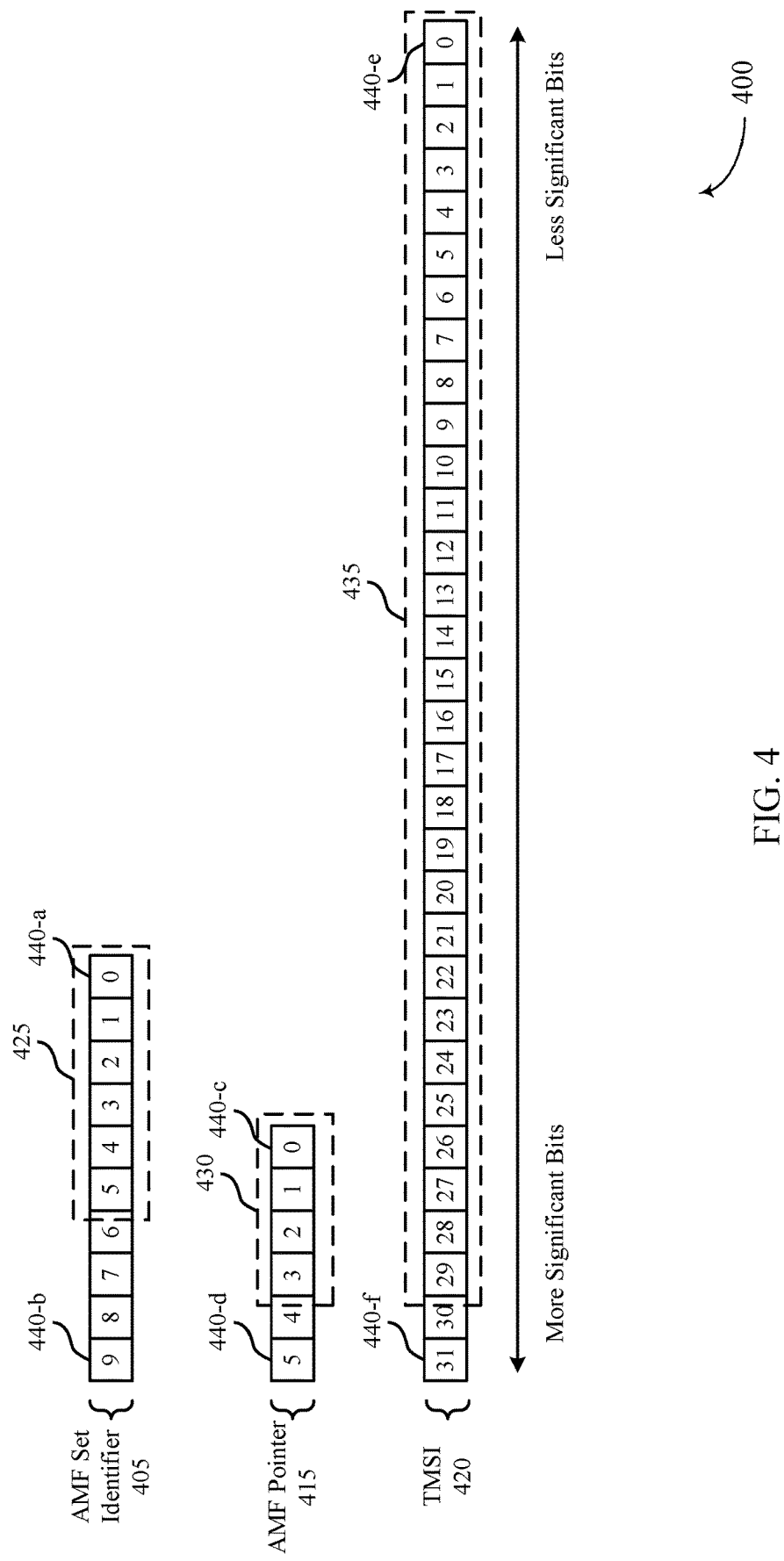

FIG. 4 illustrates examples of fields 400 that support truncated identification indicators in accordance with aspects of the present disclosure. In some examples, fields 400 may be related to wireless communications systems 100 and 200 and fields 300. For example, the fields 400 may illustrate the transition shown in FIG. 3 from the initial identification indicator (e.g., including the AMF set identifier 405, the AMF pointer 415, and the TMSI 420) to the truncated identification indicator (e.g., including the truncated AMF set identifier 425, the truncated AMF pointer 430, and the truncated TMSI 435). Further, the identification indicator 410 may be communicated between a UE and base station, which may be examples of the corresponding devices described with reference to FIGS. 1 and 2.

Each of the fields 400 may include bits 440-a for uniquely identifying components (e.g., an AMF set, one or more AMFs within an AMF set, a UE). The fields may first utilize the least significant bits 440 of each field (e.g., including the least significant bit 440-a, 440-c, and 440-e) to uniquely identify the components. In some cases, the number of bits 440 used to uniquely identify the components may be less than the total number of bits 440 in each field. For example, there may be 30 distinct values within the AMF set (e.g., uniquely identified by the AMF set identifier 405). As such, only the six least significant bits (e.g., from bit 440-a to the sixth bit, bit 5) may be used to uniquely identify the AMF set. In some cases, the remaining bits (e.g., from the seventh bit, bit 6, to the most significant bit 440-b) may include a fixed logic value (e.g., logic value '0's, logic value '1's).

Each of the fields 400 may have a fixed number of initial bits 440. For example, the initial length of the AMF set identifier 405 may be 10 bits, the initial length of the AMF pointer 415 may be 6 bits, and the initial length of the TMSI 420 may be 32 bits. The length of the initial identification identifier may be based on the lengths of each of the initial fields 400. That is, the initial identification identifier may include the concatenated AMF set identifier 405, the AMF pointer 415, and the TMSI 420. As such, the initial identification identifier may include 48 bits 440. The resources allocated for transmitting the identification identifier may include less bits than the length of the initial identification identifier. For example, the resources allocated for the identification identifier may be 40 bits while the initial identification identifier may include 48 bits.

The truncating configuration may indicate a number of bits 440 to retain of each of the fields 400. The number of bits 440 to retain may be based on a number of bits of each field used to uniquely identify a component. In some cases, the number of bits 440 to retain may include at least the bits used to uniquely identify a component. In some examples, the truncating configuration may indicate three integers each corresponding to one of the fields 400. For example, the truncating configuration may include integers n, m, and z corresponding to the number of bits (e.g., the number of least significant bits) to retain of the AMF set identifier 405, the AMF pointer 415, and the TMSI 420 respectively. The size of n, m, and z may equal to or less than the total length of the corresponding field 400. For example, n may be no larger than 10 and m may be no larger than 6. The total of n+m+z may be equivalent to the number of bits allocated for transmitting the identification indicator (e.g., 40 bits). In some cases, the number of bits of the TMSI 420 that are retained (e.g., the size of z) may be based on the number of bits retained of the AMF set identifier 405 and the AMF pointer 415. For example, the number of bits to be removed of the TMSI 420 may be equal to n+m−8. Additionally or alternatively, the number of bits retained of the TMSI 420 (e.g., the size of z) may be equal to 32−(n+m−8).

A UE may receive the truncating configuration and remove one or more bits from the fields 400 to generate a truncated identification identifier. Here, the truncating configuration may indicate 6, 4, and 30 as the values of n, m, and z. The UE may therefore remove one or more bits of the fields 400 to generate truncated fields including 6, 4, and 30 bits respectively. For example, the UE may remove the 4 most significant bits 440 from the AMF set identifier 405 to generate the truncated AMF set identifier 425. The UE may remove the 2 most significant bits from the AMF pointer 415 (e.g., from bit 440-*d*) to generate the truncated AMF pointer 415 and the UE may remove the 2 most significant bits from the TMSI 420 (e.g., from bit 440-*f*) to generate the truncated TMSI 435.

Figure 5:
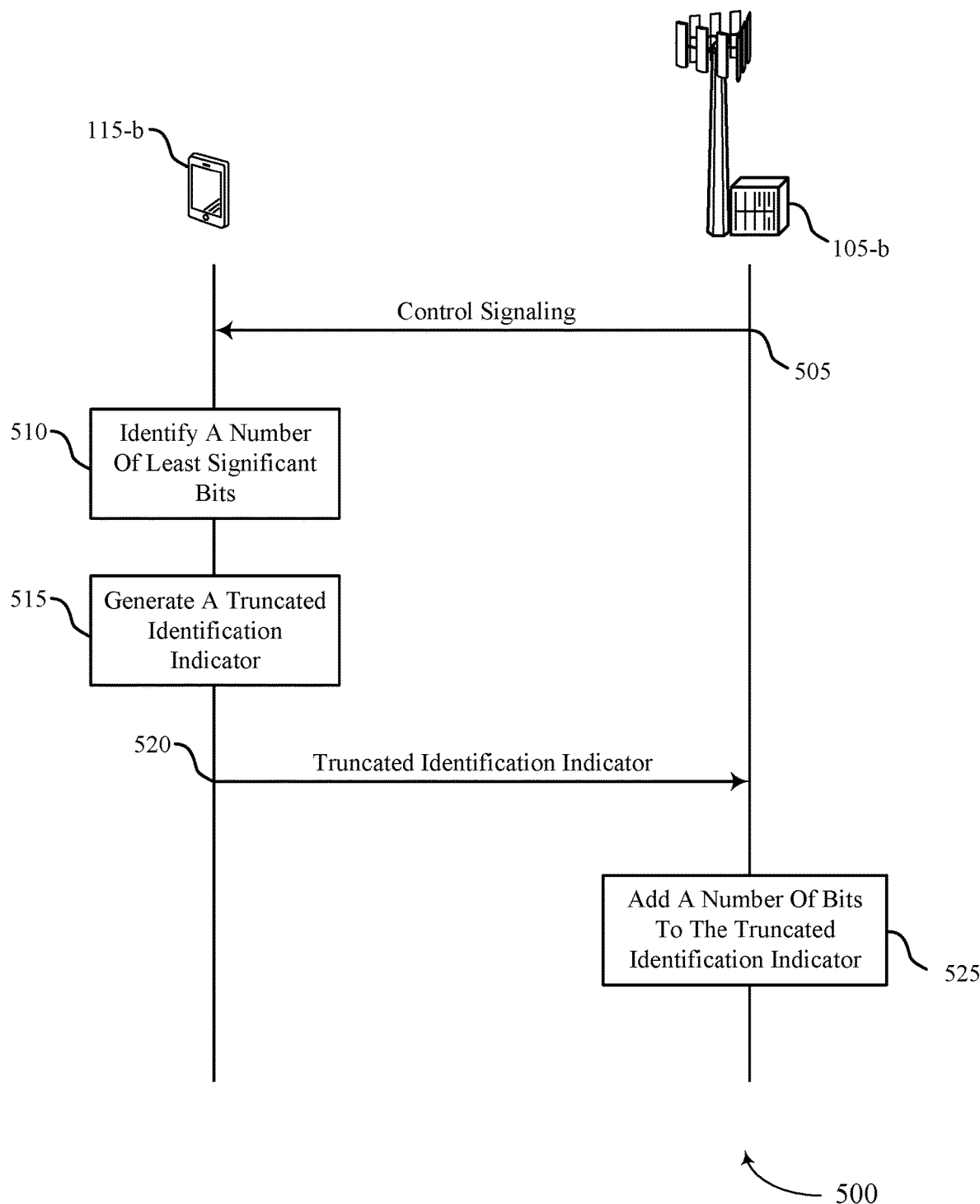
FIG. 5 illustrates an example of a process flow that supports truncated identification indicators in accordance with aspects of the present disclosure.

FIG. 5 illustrates an example of a process flow 500 that supports truncated identification indicators in accordance with aspects of the present disclosure. In some examples, the process flow 500 may implement aspects of wireless communications systems 100 and 200, or fields 300 and 400. For example, the process flow 500 may include a base station 105-*b* and a UE 115-*b*, which may be examples of the corresponding devices described with reference to FIGS. 1 and 2. In another example, the process flow 500 may show the communication of identification indicators between the UE 115-*b* and the base station 105-*b*, which may include aspects of the fields 300 and 400 as described with reference to FIGS. 3 and 4. As described above, the base station 105-*b* may correspond to a network node such as a core network node as described with reference to FIGS. 1 and 2. That is, signals transmitted by the base station 105-*b* may correspond to signals transmitted by any network node, such as a core network node including an AMF.

At 505, the base station 105-*b* or core network node such as an AMF may transmit control signaling to the UE 115-*b*. The control signaling may be dedicated control signaling or broadcast control signaling. The control signaling may indicate the truncating configuration for truncating one or more fields of an initial identification indicator. The initial identification indicator may be an identification indicator that is generated based on preconfigured or defined fields. For example, the initial identification indicator may include three fields that are preconfigured to contain 10 bits, 6 bits, and 32 bits, respectively. Therefore, the initial identification indicator may include 48 bits.

At 510, the UE 115-*b* may identify a number of least significant bits of one or more fields of the initial identification indicator based on the truncating configuration. For example, the truncating configuration may indicate three integers corresponding to three bit lengths of the three fields of the identification indicator. The UE 115-*b* may identify a number of least significant bits of each field corresponding to the integers.

At 515, the UE 115-*b* may generate truncated identification indicator according to the truncating configuration by removing one or more bits from the initial identification indicator. the truncated identification indicator may include the identified number of least significant bits. In some cases, the UE 115-*b* may generate the truncated identification indicator by removing a number of most significant bits from the fields of the initial identification indicator according to the truncating configuration.

At 520, the UE 115-*b* may transmit the truncated identification indicator to the base station 105-*b*. The truncated identification indicator may be a 5G-S-TMSI and may include 40 bits.

At 525, the base station 105-*b* may add a number of bits to the received truncated identification indicator to generate restored identification indicator. The restored identification indicator may include a same number of bits as the initial identification indicator (e.g., 40 bits). In some cases, adding the bits to the received truncated identification indicator may reconstruct the initial identification indicator. In some cases, the base station 105-*b* and the UE 115-*b* may establish a connection based on transmitting the truncated identification indicator. For example, the base station 105-*b* and the UE 115-*b* may establish an RRC connection for a control plane for an NB-IoT device connected to 5GC.

Figure 6:
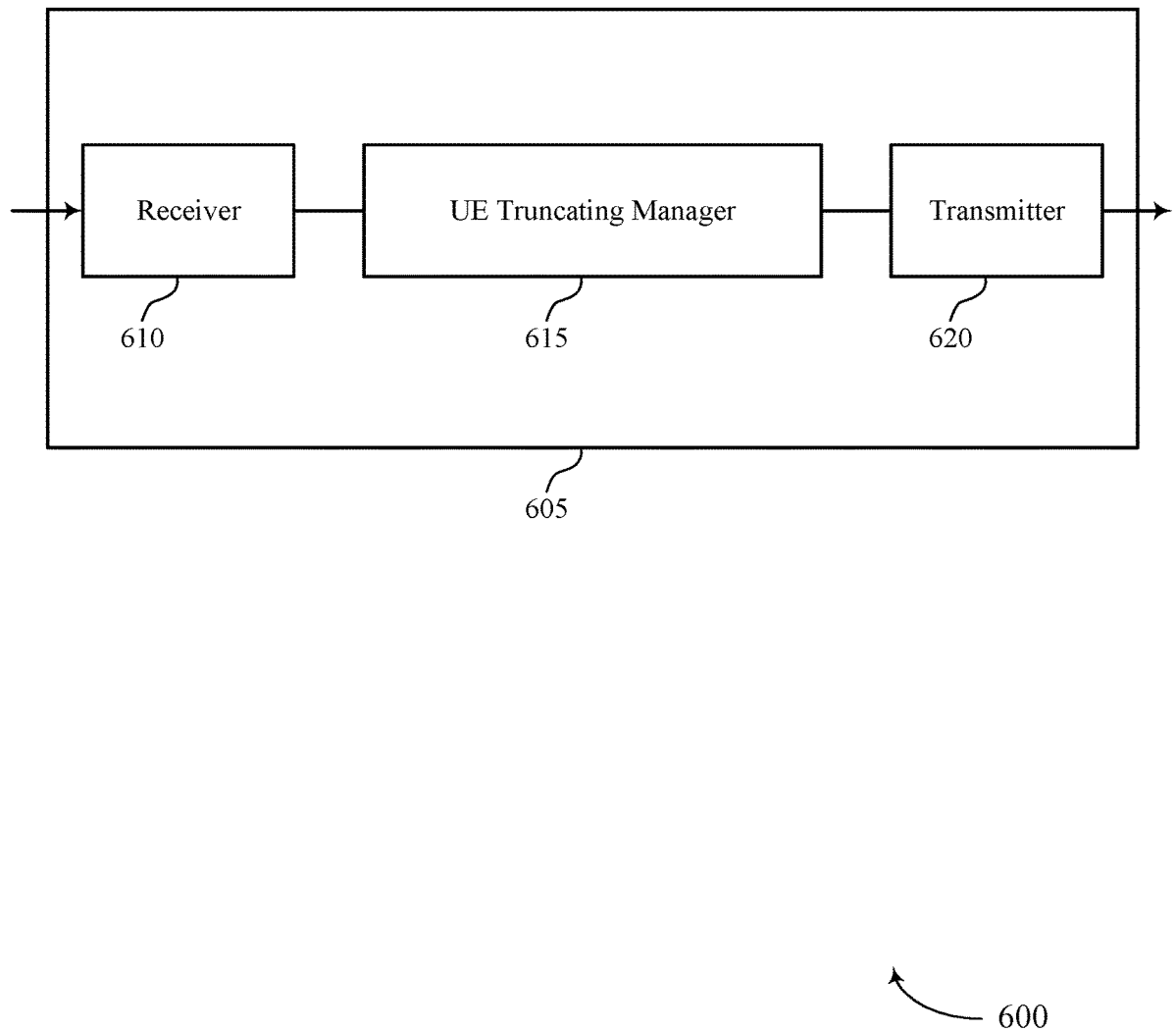
FIGS. 6 and 7 show diagrams of devices that support truncated identification indicators in accordance with aspects of the present disclosure.

FIG. 6 shows a diagram 600 of a device 605 that supports truncated identification indicators in accordance with aspects of the present disclosure. The device 605 may be an example of aspects of a UE 115 as described herein. The device 605 may include a receiver 610, a UE truncating manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to truncated identification indicators, etc.). Information may be passed on to other components of the device 605. The receiver 610 may be an example of aspects of the transceiver 820 described with reference to FIG. 8. The receiver 610 may utilize a single antenna or a set of antennas.

The UE truncating manager 615 may receive control signaling indicating a truncating configuration for truncating one or more fields of an initial identification indicator, generate a truncated identification indicator for the UE according to the truncating configuration by removing one or more bits from the initial identification indicator, and transmit the truncated identification indicator to a base station. The UE truncating manager 615 may be an example of aspects of the UE truncating manager 810 described herein.

The UE truncating manager 615, or its sub-components, may be implemented in hardware, code (e.g., software or firmware) executed by a processor, or any combination thereof. If implemented in code executed by a processor, the functions of the UE truncating manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE truncating manager 615, or its sub-components, may be physically located at various positions, including being distributed such that portions of functions are implemented at different physical locations by one or more physical components. In some examples, the UE truncating manager 615, or its sub-components, may be a separate and distinct component in accordance with various aspects of the present disclosure. In some examples, the UE truncating manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 820 described with reference to FIG. 8. The transmitter 620 may utilize a single antenna or a set of antennas.

Figure 7:
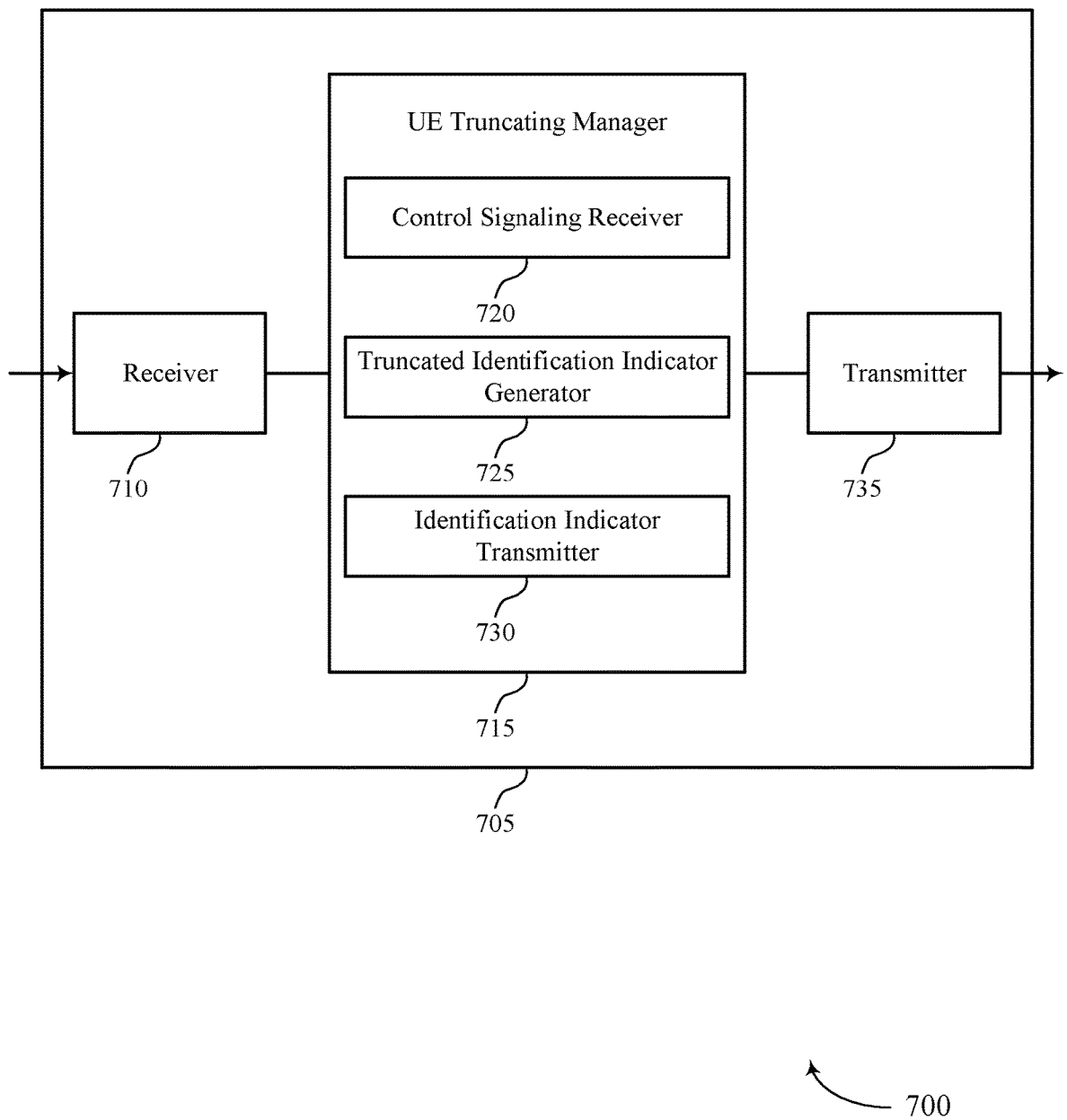

FIG. 7 shows a diagram 700 of a device 705 that supports truncated identification indicators in accordance with aspects of the present disclosure. The device 705 may be an example of aspects of a device 605, or a UE 115 as described herein. The device 705 may include a receiver 710, a UE truncating manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to truncated identification indicators, etc.). Information may be passed on to other components of the device 705. The receiver 710 may be an example of aspects of the transceiver 820 described with reference to FIG. 8. The receiver 710 may utilize a single antenna or a set of antennas.

The UE truncating manager 715 may be an example of aspects of the UE truncating manager 615 as described herein. The UE truncating manager 715 may include a control signaling receiver 720, a truncated identification indicator generator 725, and an identification indicator transmitter 730. The UE truncating manager 715 may be an example of aspects of the UE truncating manager 810 described herein.

The control signaling receiver 720 may receive control signaling indicating a truncating configuration for truncating one or more fields of an initial identification indicator. In some cases, each field of the one or more fields of the initial identification indicator includes a fixed number of bits. In some examples, the one or more fields of the initial identification indicator include a network function identifier field and a UE identifier field. In some instances, the control signaling includes dedicated control signaling or broadcast control signaling.

The truncated identification indicator generator 725 may generate a truncated identification indicator for the UE according to the truncating configuration by removing one or more bits from the initial identification indicator.

In some examples, the truncated identification indicator generator 725 may identify a number of least significant bits of one or more fields of the initial identification indicator based on the truncating configuration. In some cases, the truncated identification indicator includes a concatenation of the one or more fields of the initial identification indicator, where at least one of the one or more fields is truncated according to the truncating configuration. In some cases, the truncated identification indicator generator 725 may generate the truncated identification indicator including the identified number of least significant bits of the one or more fields. In some instances, the truncated identification indicator includes a temporary mobile subscription identifier.

In some examples, the truncated identification indicator generator 725 may remove the one or more bits from the initial identification indicator by removing a number of most significant bits from at least one of the one or more fields of the initial identification indicator according to the truncating configuration, where removing the number of most significant bits generates one or more truncated fields. Here, the truncated identification indicator generator 725 may concatenate the one or more truncated fields, where the truncated identification indicator includes the concatenated one or more truncated fields. In some examples, the truncated identification indicator generator 725 may truncate a first field of the one or more fields of the initial identification indicator based on a number of bits within a second field of one or more fields of the truncated identification indicator.

The identification indicator transmitter 730 may transmit the truncated identification indicator to a base station. In some cases, the truncated identification indicator is a radio resource control connection reestablishment message for NB-IoT. In some examples, the identification indicator transmitter 730 may establish a connection with the base station based on transmitting the truncated identification indicator.

The transmitter 735 may transmit signals generated by other components of the device 705. In some examples, the transmitter 735 may be collocated with a receiver 710 in a transceiver module. For example, the transmitter 735 may be an example of aspects of the transceiver 820 described with reference to FIG. 8. The transmitter 735 may utilize a single antenna or a set of antennas.

Figure 8:
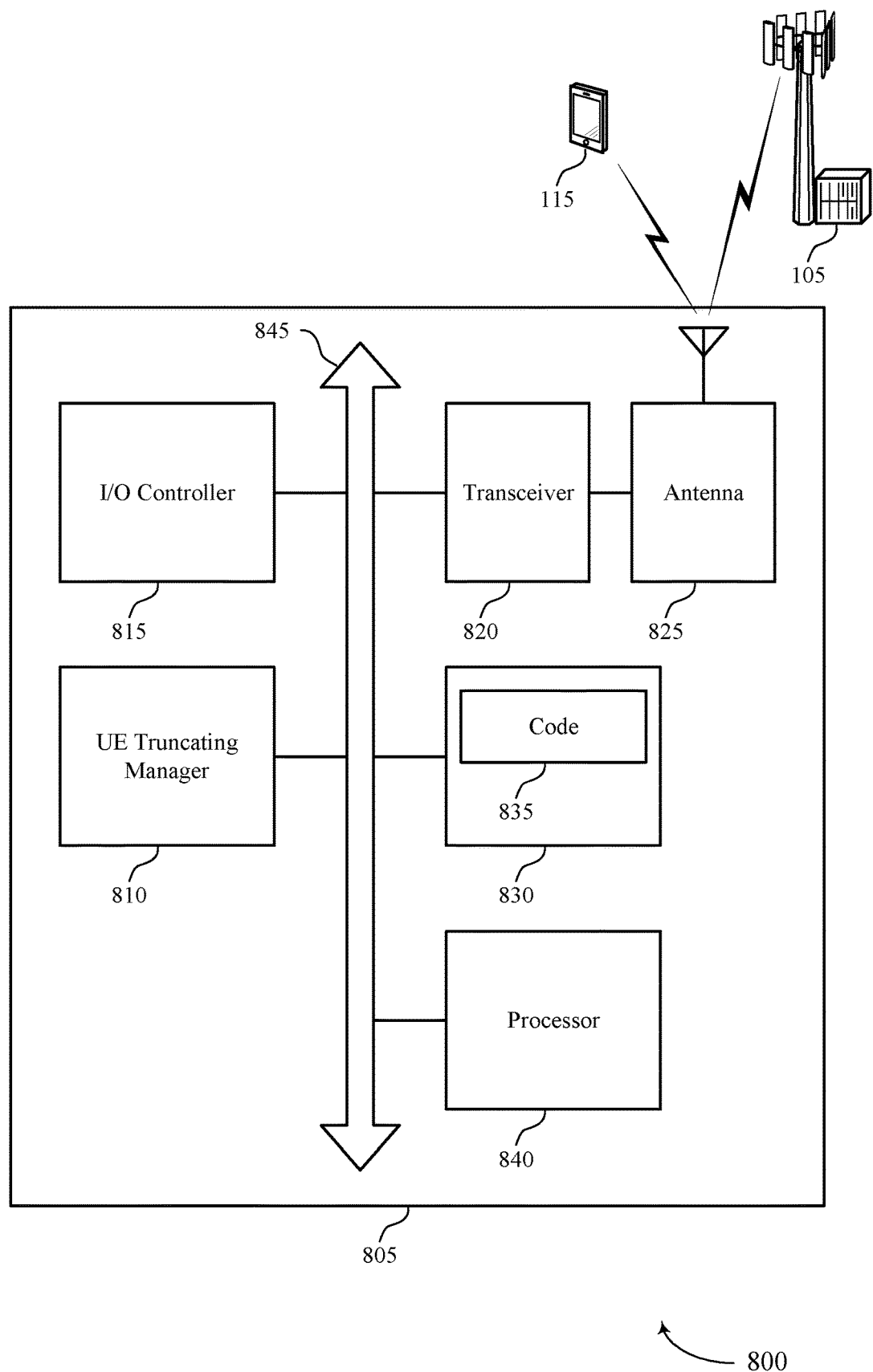
FIG. 8 shows a diagram of a system including a device that supports truncated identification indicators in accordance with aspects of the present disclosure.

FIG. 8 shows a diagram of a system 800 including a device 805 that supports truncated identification indicators in accordance with aspects of the present disclosure. The device 805 may be an example of or include the components of device 605, device 705, or a UE 115 as described herein. The device 805 may include components for bi-directional voice and data communications including components for transmitting and receiving communications, including a UE truncating manager 810, an I/O controller 815, a transceiver 820, an antenna 825, memory 830, and a processor 840. These components may be in electronic communication via one or more buses (e.g., bus 845).

The UE truncating manager 810 may receive control signaling indicating a truncating configuration for truncating one or more fields of an initial identification indicator, generate a truncated identification indicator for the UE according to the truncating configuration by removing one or more bits from the initial identification indicator, and transmit the truncated identification indicator to a base station.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting truncated identification indicators).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
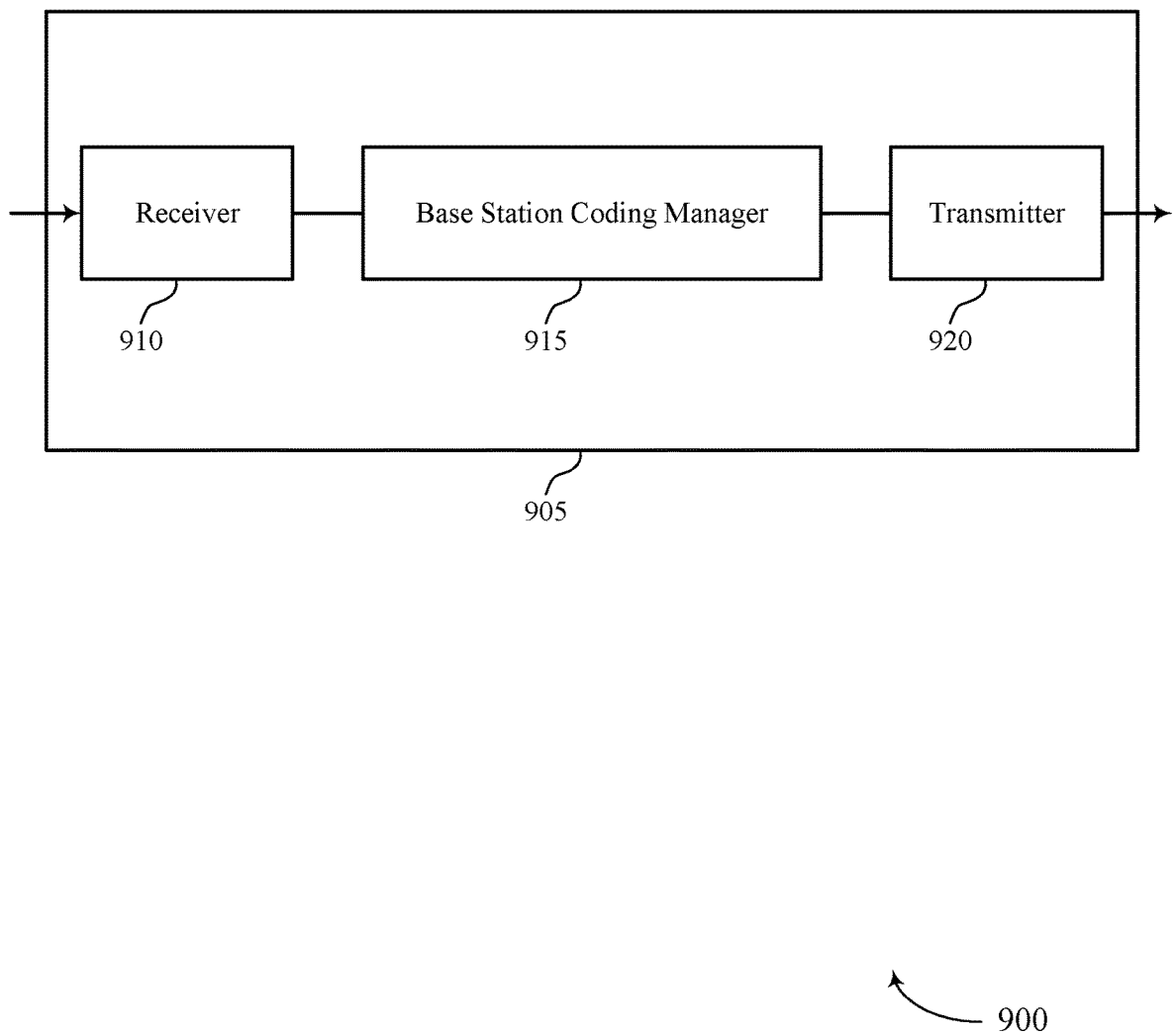
FIGS. 9 and 10 show diagrams of devices that support truncated identification indicators in accordance with aspects of the present disclosure.

FIG. 9 shows a diagram 900 of a device 905 that supports truncated identification indicators in accordance with aspects of the present disclosure. The device 905 may be an example of aspects of a base station 105 as described herein. As described above, the base station 105-b may correspond to a network node such as a core network node as described with reference to FIGS. 1 and 2. The device 905 may include a receiver 910, a base station coding manager 915, and a transmitter 920. The device 905 may also include a processor. Each of these components may be in communication with one another (e.g., via one or more buses). In some cases, the diagram 900 may correspond to more than one devices 905. For example, the device 905 may correspond to both a base station and a core network node as described herein. Here, each of these components may be in communication with one another via a wired or wireless communication.

The receiver 910 may receive information such as packets, user data, or control information associated with various information channels (e.g., control channels, data channels, and information related to truncated identification indicators, etc.). Information may be passed on to other components of the device 905. The receiver 910 may be an example of aspects of the transceiver 1220 described with reference to FIG. 12. The receiver 910 may utilize a single antenna or a set of antennas.

The base station coding manager 915 may determine a truncating configuration for truncating one or more fields of an initial identification indicator by removing one or more bits from the initial identification indicator, the truncating configuration based on a number of possible values stored in each field of the one or more fields, transmit control signaling indicating the truncating configuration, and receive a truncated identification indicator based on the truncating configuration. In some cases, the base station coding manager 915 at an AMF may determine the truncating configuration for truncating one or more fields of the initial identification indicator by removing one or more bits from the initial identification indicator and transmit control signaling indicating the truncating configuration. Additionally, the base station coding manager 915 at base station may receive the truncated identification indicator based on the truncating configuration. The base station coding manager 915 may be an example of aspects of the base station coding manager 1210 described herein.

The base station coding manager 915, or its sub-components, may be implemented in hardware, code (e.g., software or firmware) executed by a processor, or any combination thereof. If implemented in code executed by a processor, the functions of the base station coding manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station coding manager 915, or its sub-components, may be physically located at various positions, including being distributed such that portions of functions are implemented at different physical locations by one or more physical components. In some examples, the base station coding manager 915, or its sub-components, may be a separate and distinct component in accordance with various aspects of the present disclosure. In some examples, the base station coding manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
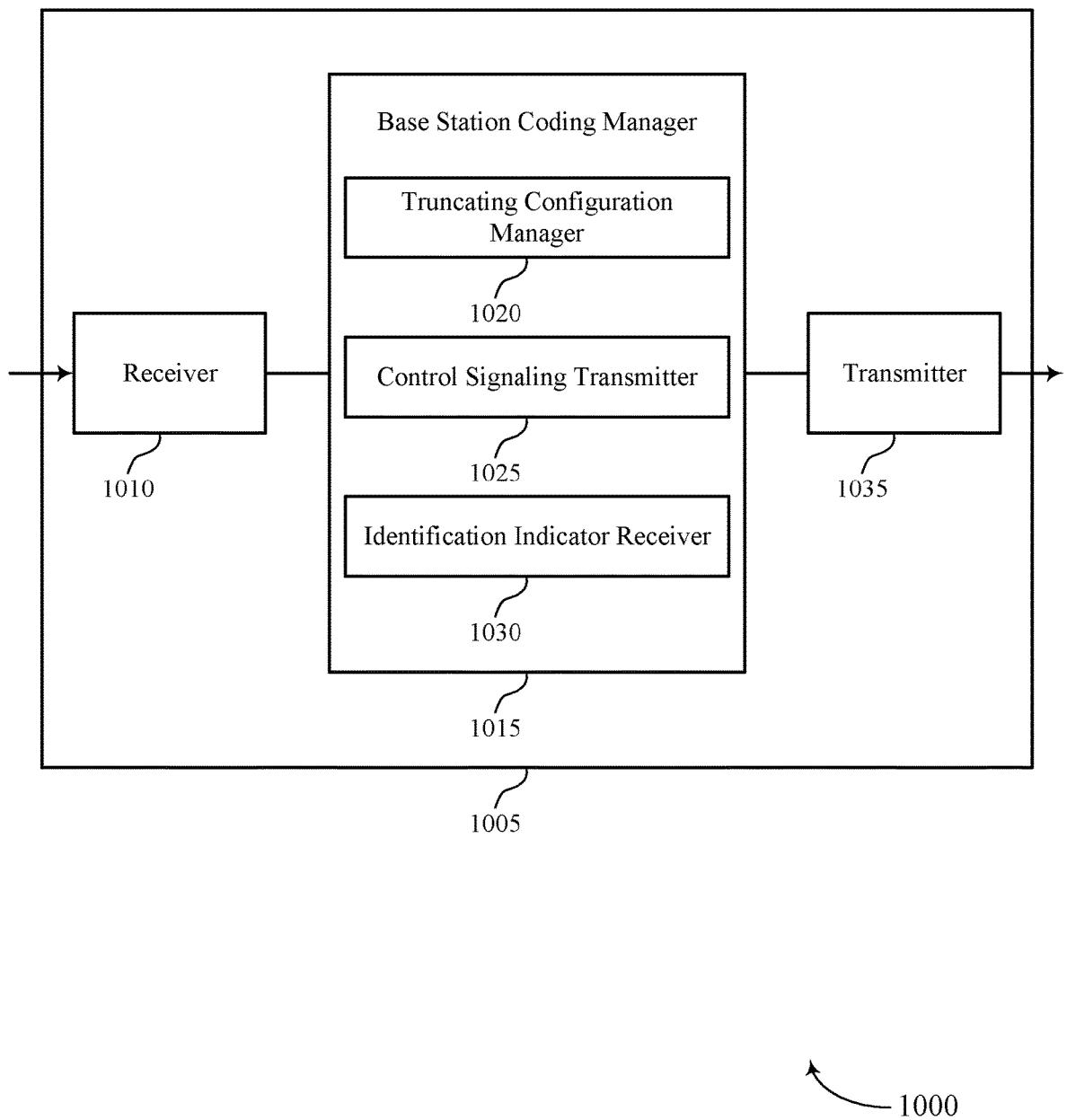

FIG. 10 shows a diagram 1000 of a device 1005 that supports truncated identification indicators in accordance with aspects of the present disclosure. The device 1005 may be an example of aspects of a device 905, or a base station 105 as described herein. The device 1005 may include a receiver 1010, a base station coding manager 1015, and a transmitter 1035. The device 1005 may also include a processor. Each of these components may be in communication with one another (e.g., via one or more buses). In some cases, the diagram 1000 may correspond to more than one devices 1005. For example, the device 1005 may correspond to both a base station and a core network node as described herein. Here, each of these components may be in communication with one another via a wired or wireless communication.

The receiver 1010 may receive information such as packets, user data, or control information associated with various information channels (e.g., control channels, data channels, and information related to truncated identification indicators, etc.). Information may be passed on to other components of the device 1005. The receiver 1010 may be an example of aspects of the transceiver 1220 described with reference to FIG. 12. The receiver 1010 may utilize a single antenna or a set of antennas.

The base station coding manager 1015 may be an example of aspects of the base station coding manager 915 as described herein. The base station coding manager 1015 may include a truncating configuration manager 1020, a control signaling transmitter 1025, and an identification indicator receiver 1030. The base station coding manager 1015 may be an example of aspects of the base station coding manager 1210 described herein.

The truncating configuration manager 1020 may determine a truncating configuration for truncating one or more fields of an initial identification indicator by removing one or more bits from the initial identification indicator, the truncating configuration based on a number of possible values stored in each field of the one or more fields.

The control signaling transmitter 1025 may transmit control signaling indicating the truncating configuration.

The identification indicator receiver 1030 may receive a truncated identification indicator based on the truncating configuration.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
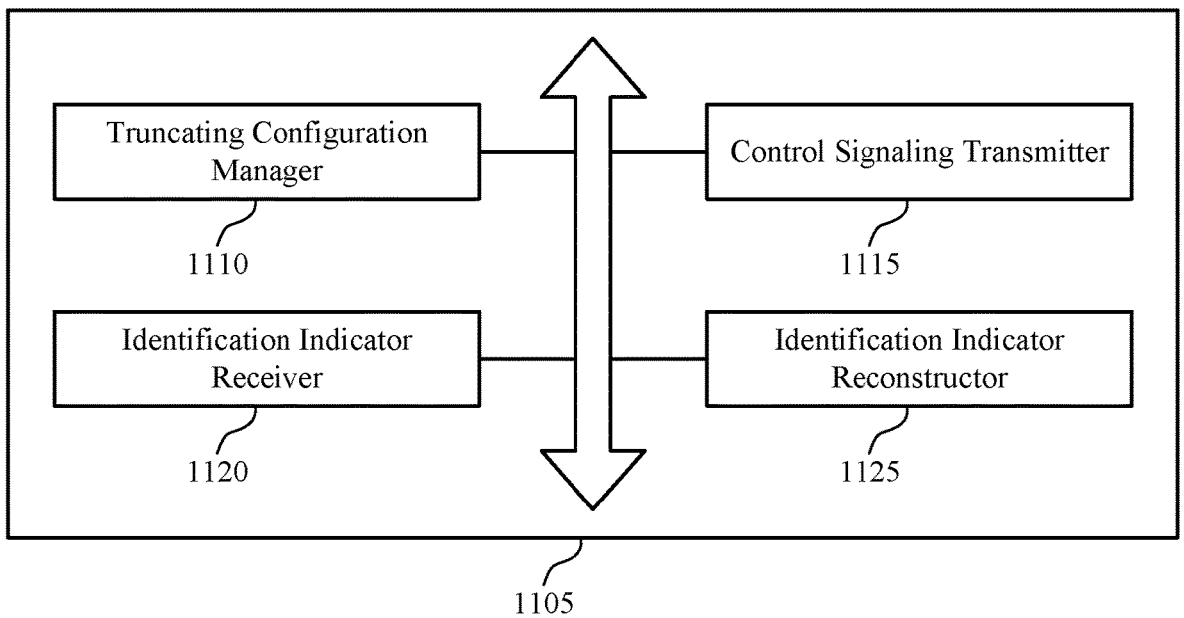
FIG. 11 shows a diagram of a base station coding manager that supports truncated identification indicators in accordance with aspects of the present disclosure.

FIG. 11 shows a diagram 1100 of a base station coding manager 1105 that supports truncated identification indicators in accordance with aspects of the present disclosure. The base station coding manager 1105 may be an example of aspects of a base station coding manager 915, a base station coding manager 1015, or a base station coding manager 1210 described herein. The base station coding manager 1105 may include a truncating configuration manager 1110, a control signaling transmitter 1115, an identification indicator receiver 1120, and an identification indicator reconstructor 1125. Each of these modules may communicate, directly or indirectly, with one another (e.g., via one or more buses, via a wired connection, via a wireless connection).

The truncating configuration manager 1110 may determine a truncating configuration for truncating one or more fields of an initial identification indicator by removing one or more bits from the initial identification indicator, the truncating configuration based on a number of possible values stored in each field of the one or more fields. In some instances, each field of the one or more fields of the initial identification indicator includes a fixed number of bits. Additionally, the one or more fields of the initial identification indicator may include a network function identifier field and a UE identifier field.

In some examples, the truncating configuration manager 1110 may identify a number of least significant bits of one or more fields of the initial identification indicator. Here, the truncating configuration may be based on the identified number of least significant bits and the truncated identification indicator may include the identified number of least significant bits of the one or more fields. In some cases, the truncating configuration manager 1110 may determine to truncate a first field of the one or more fields of the initial identification indicator based on a number of bits within a second field of one or more fields of the truncated identification indicator. In some cases, the truncating configuration manager 1110 may be at an AMF or other control network node.

The control signaling transmitter 1115 may transmit control signaling indicating the truncating configuration. In some cases, the control signaling includes dedicated control signaling or broadcast control signaling. In some cases, the control signaling transmitter 1115 may be at an AMF or other control network node.

The identification indicator receiver 1120 may receive a truncated identification indicator based on the truncating configuration. In some examples, the identification indicator receiver 1120 may establish a connection with a UE based on receiving the truncated identification indicator. In some cases, the truncated identification indicator includes a concatenation of the one or more fields of the initial identification indicator, where at least one of the one or more fields is truncated according to the truncating configuration. In some instances, the truncated identification indicator includes a temporary mobile subscription identifier. In some cases, the truncated identification indicator is a radio resource control connection reestablishment message for NB-IoT. In some cases, the identification indicator receiver 1120 may be at base station.

The identification indicator reconstructor 1125 may add a number of bits to the received truncated identification indicator to generate a restored identification indicator including a same number of bits as the initial identification indicator. In some cases, the identification indicator reconstructor 1125 may be at a base station.

Figure 12:
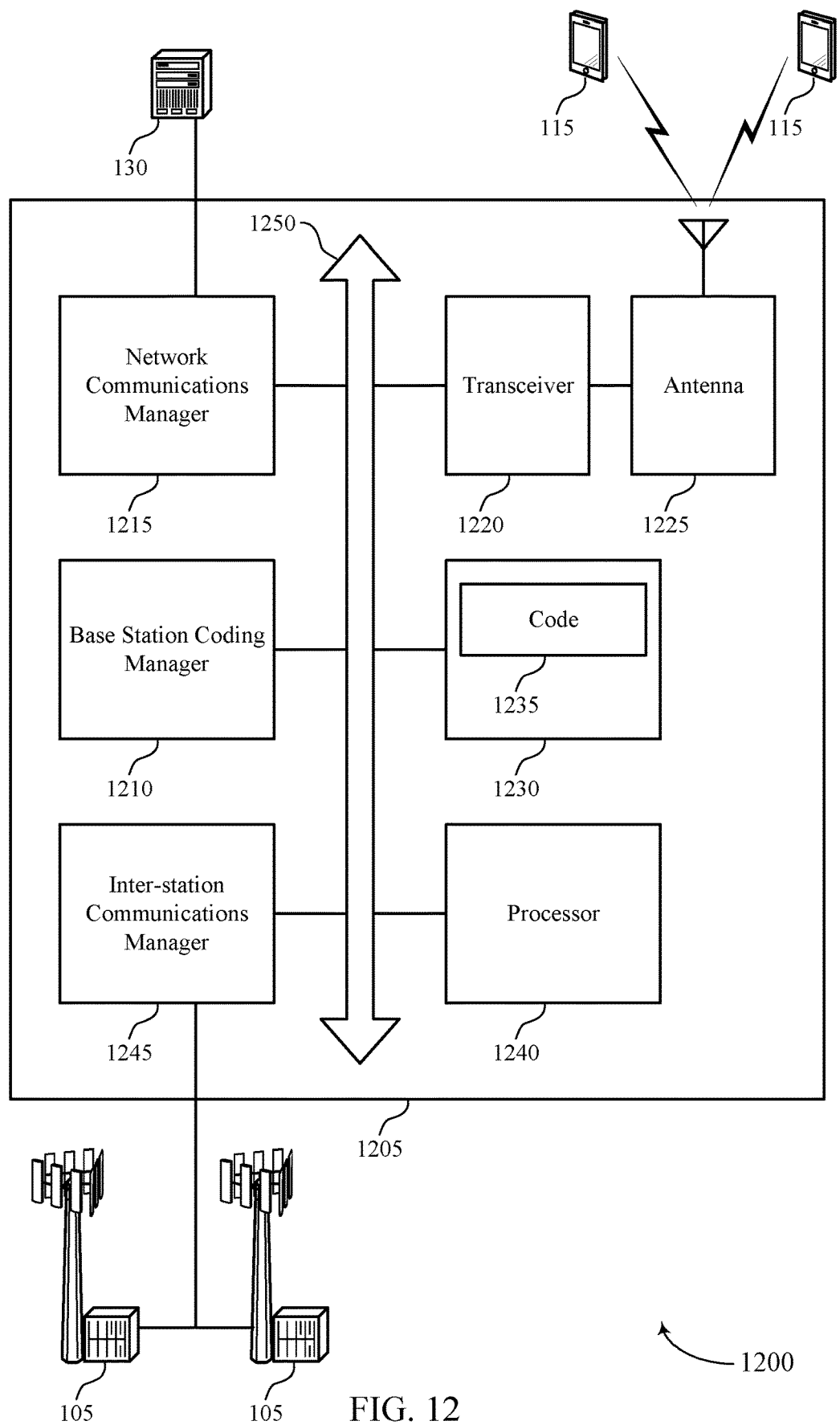
FIG. 12 shows a diagram of a system including a device that supports truncated identification indicators in accordance with aspects of the present disclosure.

FIG. 12 shows a diagram of a system 1200 including a device 1205 that supports truncated identification indicators in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station coding manager 1210, a network communications manager 1215, a transceiver 1220, an antenna 1225, memory 1230, a processor 1240, and an inter-station communications manager 1245. In some cases, the device 1205 may correspond to more than one device 1205. For example, the device 1205 may correspond to both a base station and a core network node as described herein. Here, each of these components may be in communication with one another via a wired or wireless communication. These components may be in electronic communication via one or more buses (e.g., bus 1250) or communication links (e.g., wired communication links, wireless communication links).

The base station coding manager 1210 may determine a truncating configuration for truncating one or more fields of an initial identification indicator by removing one or more bits from the initial identification indicator, the truncating configuration based on a number of possible values stored in each field of the one or more fields, transmit control signaling indicating the truncating configuration, and receive a truncated identification indicator based on the truncating configuration.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting truncated identification indicators).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
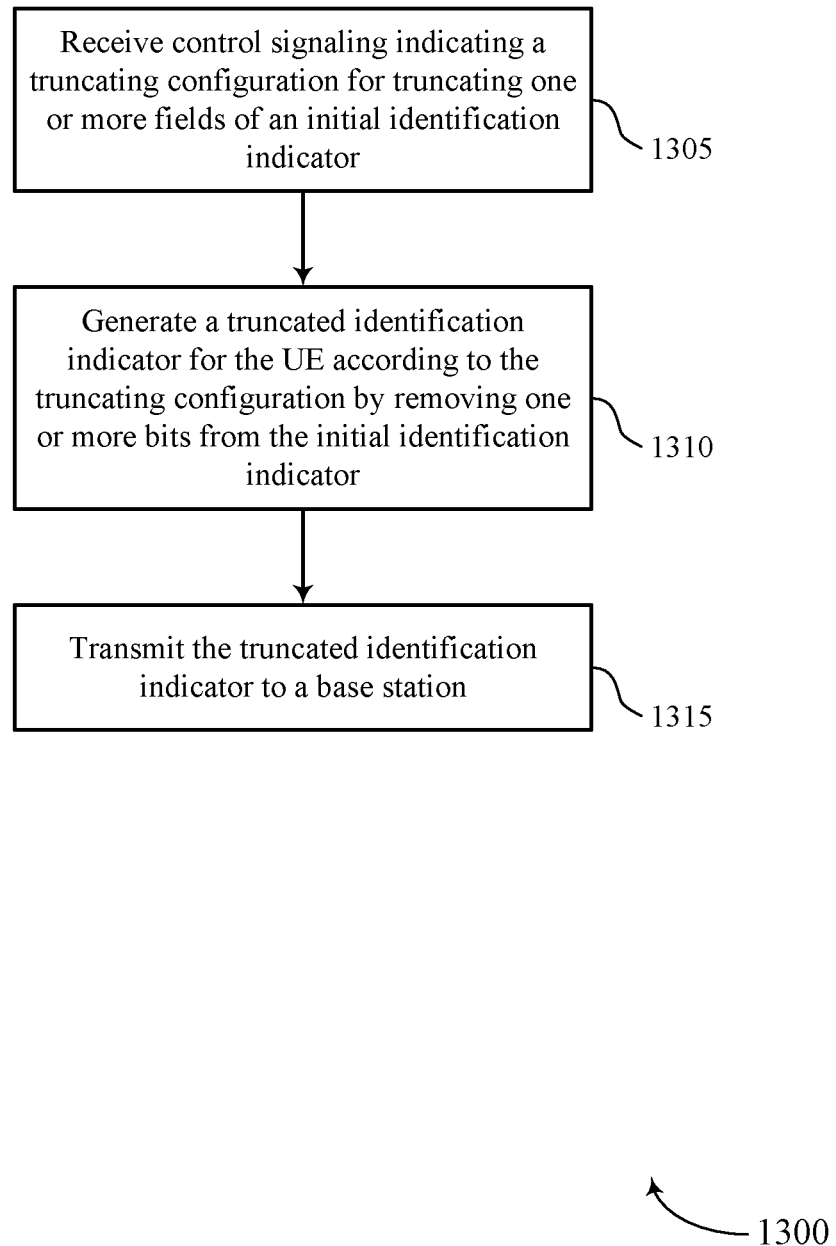
FIGS. 13 through 16 show flowcharts illustrating methods that support truncated identification indicators in accordance with aspects of the present disclosure.

FIG. 13 shows a flowchart illustrating a method 1300 that supports truncated identification indicators in accordance with aspects of the present disclosure. The operations of method 1300 may be implemented by a UE 115 or its components as described herein. For example, the operations of method 1300 may be performed by a UE truncating manager as described with reference to FIGS. 6 through 8. In some examples, a UE may execute a set of instructions to control the functional elements of the UE to perform the functions described herein. Additionally or alternatively, a UE may perform aspects of the functions described herein using special-purpose hardware.

At 1305, the UE may receive control signaling indicating a truncating configuration for truncating one or more fields of an initial identification indicator. The operations of 1305 may be performed according to the methods described herein. In some examples, aspects of the operations of 1305 may be performed by a control signaling receiver as described with reference to FIGS. 6 through 8.

At 1310, the UE may generate a truncated identification indicator for the UE according to the truncating configuration by removing one or more bits from the initial identification indicator. The operations of 1310 may be performed according to the methods described herein. In some examples, aspects of the operations of 1310 may be performed by a truncated identification indicator generator as described with reference to FIGS. 6 through 8.

At 1315, the UE may transmit the truncated identification indicator to a base station. The operations of 1315 may be performed according to the methods described herein. In some examples, aspects of the operations of 1315 may be performed by an identification indicator transmitter as described with reference to FIGS. 6 through 8.

Figure 14:
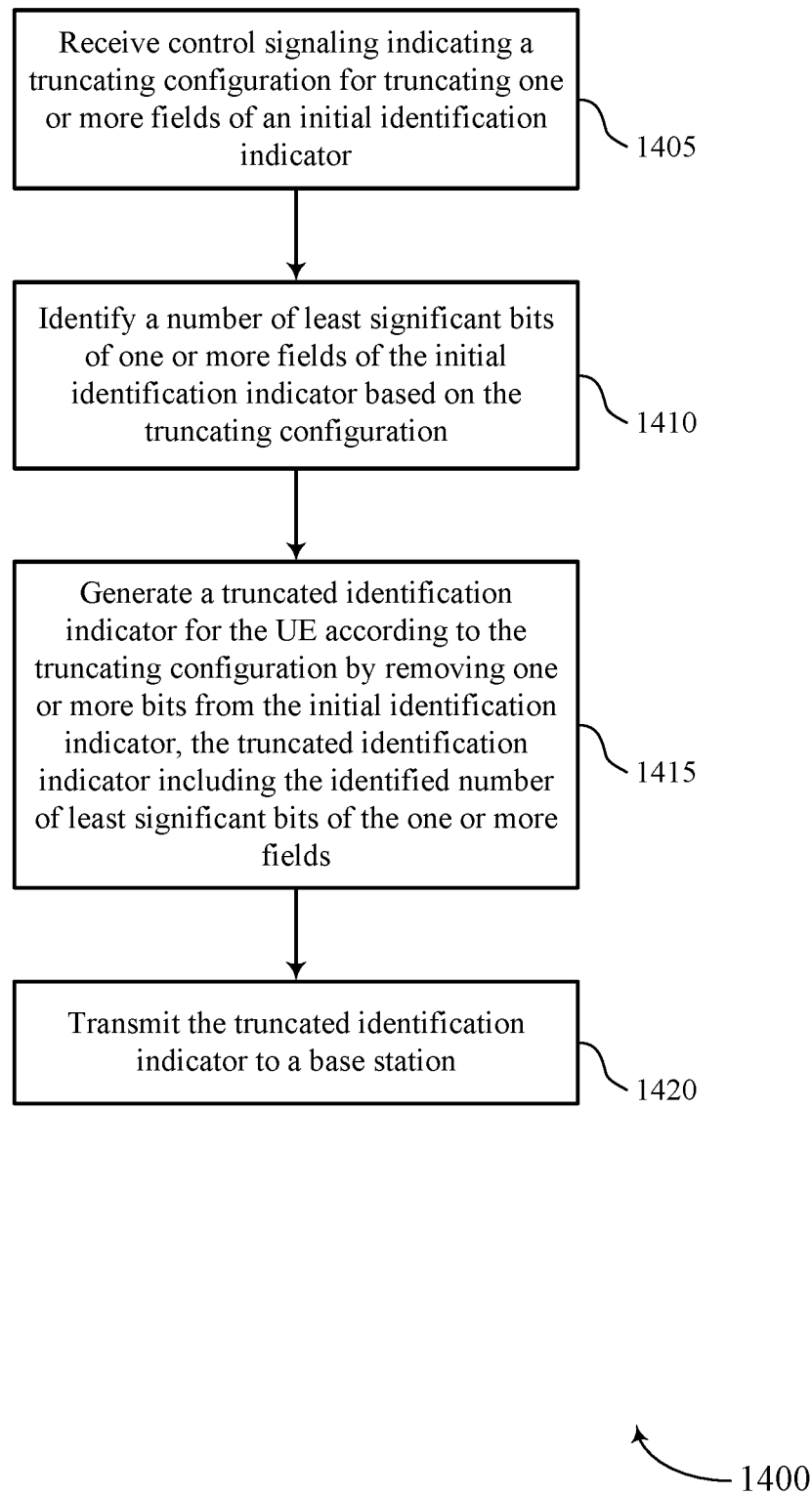

FIG. 14 shows a flowchart illustrating a method 1400 that supports truncated identification indicators in accordance with aspects of the present disclosure. The operations of method 1400 may be implemented by a UE 115 or its components as described herein. For example, the operations of method 1400 may be performed by a UE truncating manager as described with reference to FIGS. 6 through 8. In some examples, a UE may execute a set of instructions to control the functional elements of the UE to perform the functions described herein. Additionally or alternatively, a UE may perform aspects of the functions described herein using special-purpose hardware.

At 1405, the UE may receive control signaling indicating a truncating configuration for truncating one or more fields of an initial identification indicator. The operations of 1405 may be performed according to the methods described herein. In some examples, aspects of the operations of 1405 may be performed by a control signaling receiver as described with reference to FIGS. 6 through 8.

At 1410, the UE may identify a number of least significant bits of one or more fields of the initial identification indicator based on the truncating configuration. The operations of 1410 may be performed according to the methods described herein. In some examples, aspects of the operations of 1410 may be performed by a truncated identification indicator generator as described with reference to FIGS. 6 through 8.

At 1415, the UE may generate a truncated identification indicator for the UE according to the truncating configuration by removing one or more bits from the initial identification indicator. The truncated identification indicator may include the identified number of least significant bits of the one or more fields. The operations of 1415 may be performed according to the methods described herein. In some examples, aspects of the operations of 1415 may be performed by a truncated identification indicator generator as described with reference to FIGS. 6 through 8.

At 1420, the UE may transmit the truncated identification indicator to a base station. The operations of 1420 may be performed according to the methods described herein. In some examples, aspects of the operations of 1420 may be performed by an identification indicator transmitter as described with reference to FIGS. 6 through 8.

Figure 15:
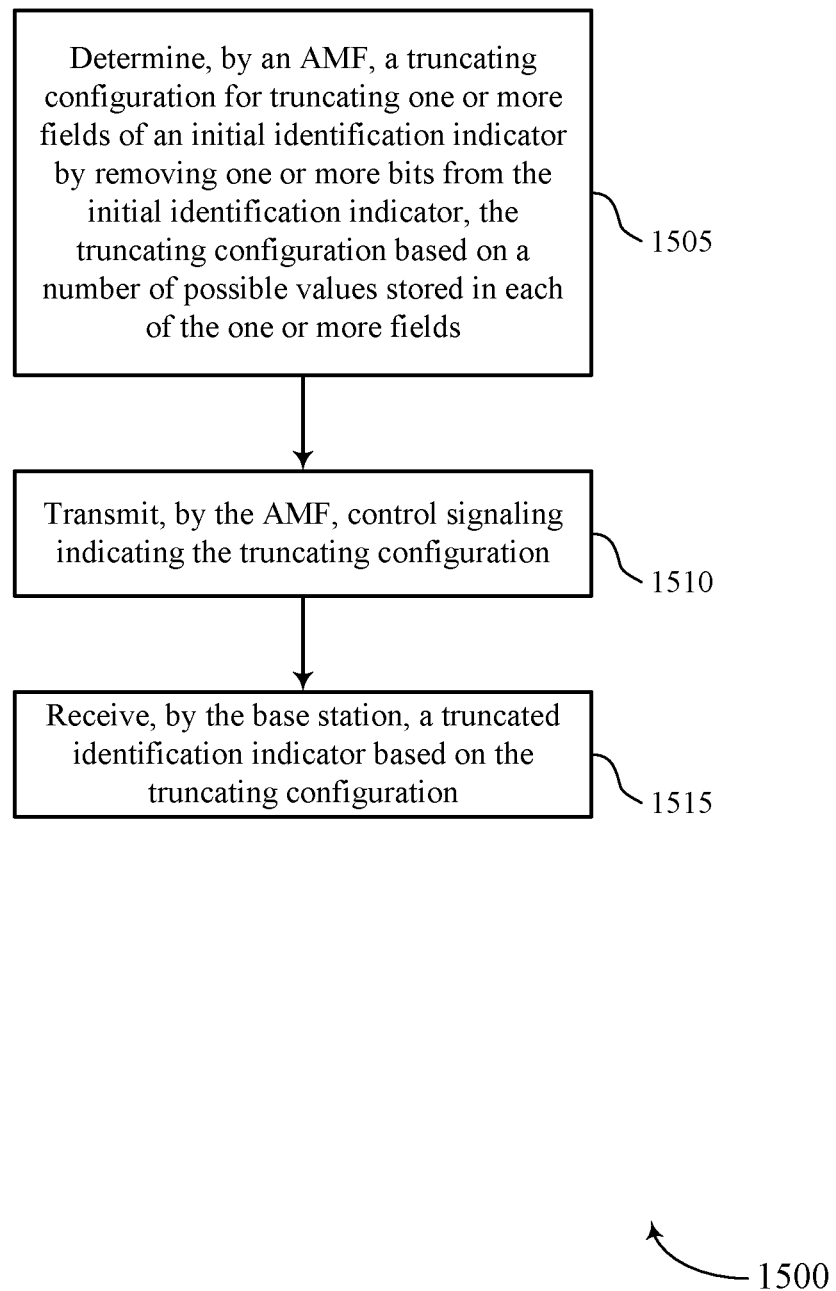

FIG. 15 shows a flowchart illustrating a method 1500 that supports truncated identification indicators in accordance with aspects of the present disclosure. The operations of method 1500 may be implemented by a network as described herein. For example, the operations of method 1500 may be implemented by network nodes within the network such as an AMF, base station 105, or components of the AMF or base station 105 as described herein. For example, the operations of method 1500 may be performed by a base station coding manager as described with reference to FIGS. 9 through 12. In some examples, an AMF and base station may execute a set of instructions to control the functional elements of the AMF and base station, respectively, to perform the functions described herein. Additionally or alternatively, an AMF and base station may perform aspects of the functions described herein using special-purpose hardware.

At 1505, the AMF may determine a truncating configuration for truncating one or more fields of an initial identification indicator by removing one or more bits from the initial identification indicator, the truncating configuration based on a number of possible values stored in each field of the one or more fields. The operations of 1505 may be performed according to the methods described herein. In some examples, aspects of the operations of 1505 may be performed by a truncating configuration manager as described with reference to FIGS. 9 through 12.

At 1510, the AMF may transmit control signaling indicating the truncating configuration. The operations of 1510 may be performed according to the methods described herein. In some examples, aspects of the operations of 1510 may be performed by a control signaling transmitter as described with reference to FIGS. 9 through 12.

At 1515, the base station may receive a truncated identification indicator based on the truncating configuration. The operations of 1515 may be performed according to the methods described herein. In some examples, aspects of the operations of 1515 may be performed by an identification indicator receiver as described with reference to FIGS. 9 through 12.

Figure 16:
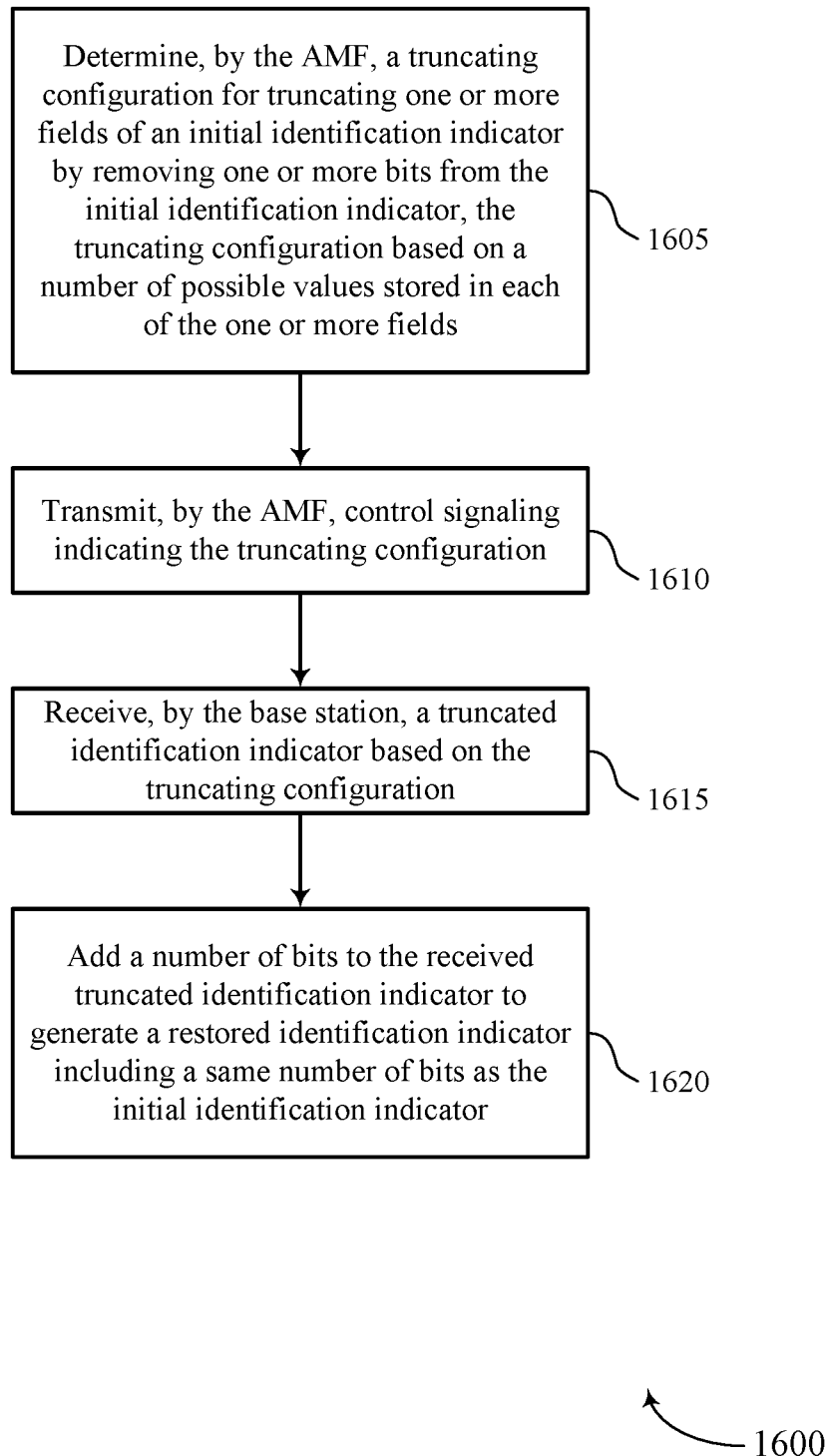

FIG. 16 shows a flowchart illustrating a method 1600 that supports truncated identification indicators in accordance with aspects of the present disclosure. The operations of method 1600 may be implemented by a network as described herein. For example, the operations of method 1600 may be implemented by network nodes within the network such as an AMF, base station 105, or components of the AMF or base station 105 as described herein. For example, the operations of method 1600 may be performed by a base station coding manager as described with reference to FIGS. 9 through 12. In some examples, an AMF or base station may execute a set of instructions to control the functional elements of the AMF or base station, respectively, to perform the functions described herein. Additionally or alternatively, an AMF or a base station may perform aspects of the functions described herein using special-purpose hardware.

At 1605, the AMF may determine a truncating configuration for truncating one or more fields of an initial identification indicator by removing one or more bits from the initial identification indicator, the truncating configuration based on a number of possible values stored in each field of the one or more fields. The operations of 1605 may be performed according to the methods described herein. In some examples, aspects of the operations of 1605 may be performed by a truncating configuration manager as described with reference to FIGS. 9 through 12.

At 1610, the AMF may transmit control signaling indicating the truncating configuration. The operations of 1610 may be performed according to the methods described herein. In some examples, aspects of the operations of 1610 may be performed by a control signaling transmitter as described with reference to FIGS. 9 through 12.

At 1615, the base station may receive a truncated identification indicator based on the truncating configuration. The operations of 1615 may be performed according to the methods described herein. In some examples, aspects of the operations of 1615 may be performed by an identification indicator receiver as described with reference to FIGS. 9 through 12.

At 1620, the base station may add a number of bits to the received truncated identification indicator to generate a restored identification indicator including a same number of bits as the initial identification indicator. The operations of 1620 may be performed according to the methods described herein. In some examples, aspects of the operations of 1620 may be performed by an identification indicator reconstructor as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving control signaling indicating a truncating configuration for truncating one or more fields of an initial identification indicator;
   generating a truncated identification indicator for the UE according to the truncating configuration by removing a number of most significant bits from at least one of the one or more fields of the initial identification indicator according to the truncating configuration, wherein removing the number of most significant bits generates one or more truncated fields, and by concatenating the one or more truncated fields, wherein the truncated identification indicator comprises the concatenated one or more truncated fields; and
   transmitting the truncated identification indicator to a base station.

2. The method of claim 1, further comprising:
   identifying a number of least significant bits of the one or more fields of the initial identification indicator based at least in part on the truncating configuration; and
   generating the truncated identification indicator comprising the identified number of least significant bits of the one or more fields.

3. The method of claim 1, wherein the truncated identification indicator comprises a concatenation of the one or more fields of the initial identification indicator, wherein at least one of the one or more fields is truncated according to the truncating configuration.

4. The method of claim 1, wherein each field of the one or more fields of the initial identification indicator comprises a fixed number of bits.

5. The method of claim 1, wherein generating the truncated identification indicator further comprises:
   truncating a first field of the one or more fields of the initial identification indicator based at least in part on a number of bits within a second field of the one or more fields of the truncated identification indicator.

6. The method of claim 1, wherein the one or more fields of the initial identification indicator comprise a network function identifier field and a UE identifier field.

7. The method of claim 1, wherein the truncated identification indicator comprises a temporary mobile subscription identifier.

8. The method of claim 1, wherein the control signaling comprises dedicated control signaling or broadcast control signaling.

9. The method of claim 1, wherein the truncated identification indicator is a radio resource control connection reestablishment message for narrowband-internet of things.

10. The method of claim 1, further comprising:
   establishing a connection with the base station based at least in part on transmitting the truncated identification indicator.

11. The method of claim 1, wherein receiving the control signaling comprises:
   receiving the control signaling from an access and mobility management function.

12. A method for wireless communications at a network comprising an access and mobility management function and a base station, comprising:
   determining, by the access and mobility management function, a truncating configuration for truncating one or more fields of an initial identification indicator by removing one or more bits from the initial identification indicator, the truncating configuration based at least in part on a number of possible values stored in each field of the one or more fields;
   transmitting, by the access and mobility management function, control signaling indicating the truncating configuration; and
   receiving, by the base station, a truncated identification indicator based at least in part on the truncating configuration, wherein the truncated identification indicator is a result of removing a number of most significant bits from at least one of the one or more fields of the initial identification indicator according to the truncating configuration, wherein removing the number of most significant bits generates one or more truncated fields, and wherein the truncated identification indicator is the result of concatenating the one or more truncated fields according to the truncating configuration, wherein the truncated identification indicator comprises the concatenated one or more truncated fields.

13. The method of claim 12, further comprising:
   adding a number of bits to the received truncated identification indicator to generate a restored identification indicator comprising a same number of bits as the initial identification indicator.

14. The method of claim 12, further comprising:
   identifying a number of least significant bits of the one or more fields of the initial identification indicator, wherein the truncating configuration is based at least in part on the identified number of least significant bits and the truncated identification indicator comprises the identified number of least significant bits of the one or more fields.

15. The method of claim 12, wherein the truncated identification indicator comprises a concatenation of the one or more fields of the initial identification indicator, wherein at least one of the one or more fields is truncated according to the truncating configuration.

16. The method of claim 12, wherein each field of the one or more fields of the initial identification indicator comprises a fixed number of bits.

17. The method of claim 12, wherein determining the truncating configuration further comprises:
   determining to truncate a first field of the one or more fields of the initial identification indicator based at least in part on a number of bits within a second field of the one or more fields of the truncated identification indicator.

18. The method of claim 12, wherein the one or more fields of the initial identification indicator comprise a network function identifier field and a UE identifier field.

19. The method of claim 12, wherein the truncated identification indicator comprises a temporary mobile subscription identifier.

20. The method of claim 12, wherein the control signaling comprises dedicated control signaling or broadcast control signaling.

21. The method of claim 12, wherein the truncated identification indicator is a radio resource control connection reestablishment message for narrowband-internet of things.

22. The method of claim 12, further comprising:
   establishing a connection with a user equipment (UE) based at least in part on receiving the truncated identification indicator.

23. An apparatus for wireless communications at a user equipment (UE), comprising:
   a processor,
   memory coupled with the processor; and
   instructions stored in the memory and executable by the processor to cause the apparatus to:
      receive control signaling indicating a truncating configuration for truncating one or more fields of an initial identification indicator;
      generate a truncated identification indicator for the UE according to the truncating configuration by removing a number of most significant bits from at least one of the one or more fields of the initial identification indicator according to the truncating configuration, wherein removing the number of most significant bits generates one or more truncated fields, and by concatenating the one or more truncated fields, wherein the truncated identification indicator comprises the concatenated one or more truncated fields; and
      transmit the truncated identification indicator to a base station.

24. The apparatus of claim 23, wherein the instructions are further executable by the processor to cause the apparatus to:
   identify a number of least significant bits of the one or more fields of the initial identification indicator based at least in part on the truncating configuration; and
   generate the truncated identification indicator comprising the identified number of least significant bits of the one or more fields.

25. The apparatus of claim 23, wherein the truncated identification indicator comprises a concatenation of the one or more fields of the initial identification indicator, wherein at least one of the one or more fields is truncated according to the truncating configuration.

26. The apparatus of claim 23, wherein each field of the one or more fields of the initial identification indicator comprises a fixed number of bits.

27. The apparatus of claim 23, wherein the instructions for generating the truncated identification indicator are further executable by the processor to cause the apparatus to:
truncate a first field of the one or more fields of the initial identification indicator based at least in part on a number of bits within a second field of the one or more fields of the truncated identification indicator.

28. The apparatus of claim 23, wherein the one or more fields of the initial identification indicator comprise a network function identifier field and a UE identifier field.

29. The apparatus of claim 23, wherein the truncated identification indicator comprises a temporary mobile subscription identifier.

30. The apparatus of claim 23, wherein the control signaling comprises dedicated control signaling or broadcast control signaling.

31. The apparatus of claim 23, wherein the truncated identification indicator is a radio resource control connection reestablishment message for narrowband-internet of things.

32. The apparatus of claim 23, wherein the instructions are further executable by the processor to cause the apparatus to:
establish a connection with the base station based at least in part on transmitting the truncated identification indicator.

33. The apparatus of claim 23, wherein the instructions for receiving the control signaling are further executable by the processor to cause the apparatus to:
receive the control signaling from an access and mobility management function.

34. An apparatus for wireless communications at a user equipment (UE), comprising:
means for receiving control signaling indicating a truncating configuration for truncating one or more fields of an initial identification indicator;
means for generating a truncated identification indicator for the UE according to the truncating configuration by removing a number of most significant bits from at least one of the one or more fields of the initial identification indicator according to the truncating configuration, wherein removing the number of most significant bits generates one or more truncated fields, and by concatenating the one or more truncated fields, wherein the truncated identification indicator comprises the concatenated one or more truncated fields; and
means for transmitting the truncated identification indicator to a base station.

35. A wireless communications network comprising an access and mobility management function and a base station, comprising:
means for determining, by the access and mobility management function, a truncating configuration for truncating one or more fields of an initial identification indicator by removing one or more bits from the initial identification indicator, the truncating configuration based at least in part on a number of possible values stored in each field of the one or more fields;
means for transmitting, by the access and mobility management function, control signaling indicating the truncating configuration; and
means for receiving, by the base station, a truncated identification indicator based at least in part on the truncating configuration, wherein the truncated identification indicator is a result of removing a number of most significant bits from at least one of the one or more fields of the initial identification indicator according to the truncating configuration, wherein removing the number of most significant bits generates one or more truncated fields, and wherein the truncated identification indicator is the result of concatenating the one or more truncated fields according to the truncating configuration, wherein the truncated identification indicator comprises the concatenated one or more truncated fields.

36. A non-transitory computer-readable medium storing code for wireless communications at a user equipment (UE), the code comprising instructions executable by a processor to:
receive control signaling indicating a truncating configuration for truncating one or more fields of an initial identification indicator;
generate a truncated identification indicator for the UE according to the truncating configuration by removing a number of most significant bits from at least one of the one or more fields of the initial identification indicator according to the truncating configuration, wherein removing the number of most significant bits generates one or more truncated fields, and by concatenating the one or more truncated fields, wherein the truncated identification indicator comprises the concatenated one or more truncated fields; and
transmit the truncated identification indicator to a base station.

37. A non-transitory computer-readable medium storing code for wireless communications, the code comprising instructions executable by a processor to:
determine, by an access and mobility management function, a truncating configuration for truncating one or more fields of an initial identification indicator by removing one or more bits from the initial identification indicator, the truncating configuration based at least in part on a number of possible values stored in each field of the one or more fields;
transmit, by the access and mobility management function, control signaling indicating the truncating configuration; and
receive, by a base station, a truncated identification indicator based at least in part on the truncating configuration, wherein the truncated identification indicator is a result of removing a number of most significant bits from at least one of the one or more fields of the initial identification indicator according to the truncating configuration, wherein removing the number of most significant bits generates one or more truncated fields, and wherein the truncated identification indicator is the result of concatenating the one or more truncated fields according to the truncating configuration, wherein the truncated identification indicator comprises the concatenated one or more truncated fields.

* * * * *